(12) United States Patent
Ishizaki et al.

(10) Patent No.: US 9,274,653 B2
(45) Date of Patent: Mar. 1, 2016

(54) TOUCH DETECTION DEVICE AND DISPLAY DEVICE HAVING TOUCH SENSOR FUNCTION

(75) Inventors: Koji Ishizaki, Aichi (JP); Kouji Noguchi, Kanagawa (JP); Takeya Takeuchi, Aichi (JP); Takayuki Nakanishi, Aichi (JP); Yasuyuki Teranishi, Aichi (JP)

(73) Assignee: Japan Display, Inc., Tokyo (JP)

( * ) Notice: Subject to any disclaimer, the term of this patent is extended or adjusted under 35 U.S.C. 154(b) by 1293 days.

(21) Appl. No.: 12/791,667

(22) Filed: Jun. 1, 2010

(65) Prior Publication Data

US 2010/0328255 A1     Dec. 30, 2010

(30) Foreign Application Priority Data

Jun. 30, 2009  (JP) ................................ P2009-155188

(51) Int. Cl.
*G06F 3/044*  (2006.01)

(52) U.S. Cl.
CPC ...................................... *G06F 3/044* (2013.01)

(58) Field of Classification Search
None
See application file for complete search history.

(56) References Cited

U.S. PATENT DOCUMENTS

| | | | |
|---|---|---|---|
| 8,144,126 B2 * | 3/2012 | Wright | 345/173 |
| 2005/0285983 A1 * | 12/2005 | Chiang et al. | 349/38 |
| 2006/0038791 A1 * | 2/2006 | Mackey | 345/173 |
| 2008/0062140 A1 * | 3/2008 | Hotelling et al. | 345/173 |
| 2010/0059295 A1 * | 3/2010 | Hotelling et al. | 178/18.06 |

FOREIGN PATENT DOCUMENTS

JP     2008-009750     1/2008

* cited by examiner

*Primary Examiner* — Amr Awad
*Assistant Examiner* — Andre Matthews
(74) *Attorney, Agent, or Firm* — Robert J. Depke; The Chicago Technology Law Group, LLC

(57) ABSTRACT

A touch detection device includes: a detection surface; a plurality of sensor lines formed from a plurality of types of wiring lines having a different line capacitance; and a touch detection unit which detects an electric variation generated in a plurality of the sensor lines in response to touch or proximity of a detection target object to the detection surface, wherein the touch detection unit has an operational circuit for generating a detection signal representing the electric variation by performing an operation process using a line capacitance ratio for a plurality of outputs from a plurality of types of the sensor lines neighboring to one another with a different line capacitance.

20 Claims, 23 Drawing Sheets

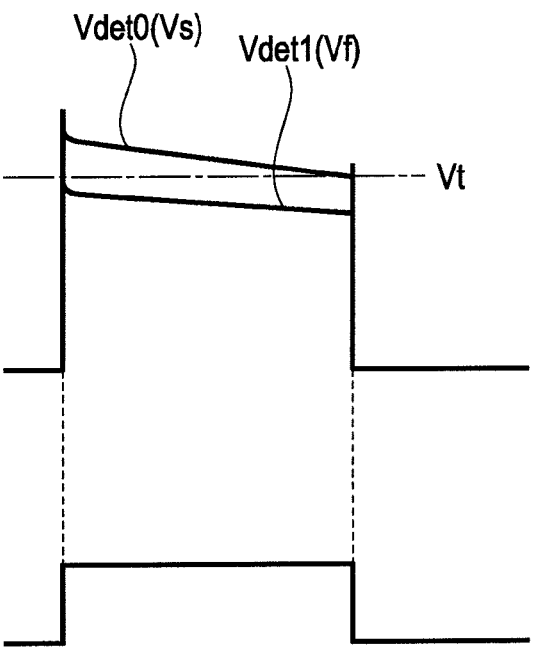
FIG. 3A
FIG. 3B
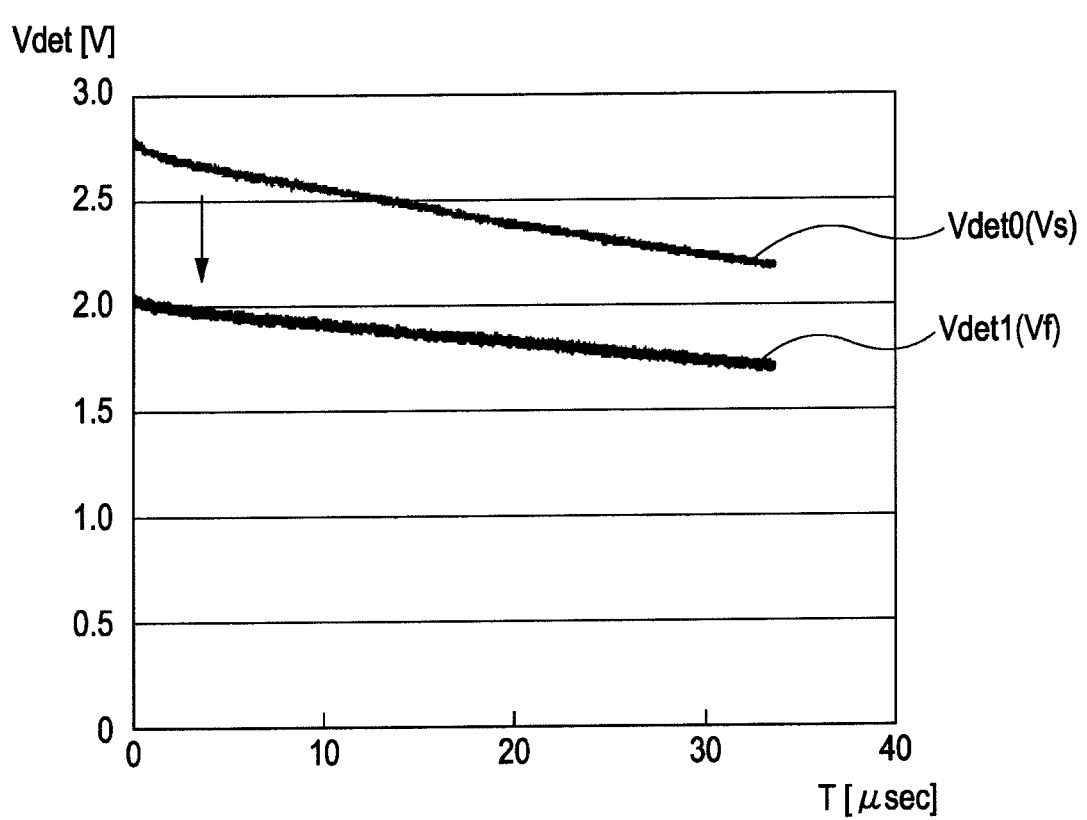
FIG. 3C

FIG. 5C   $Vs = V1 \times \dfrac{Cp}{mCp + Cc}$

LSLi OUTPUT ⟨L⟩

SSLi OUTPUT ⟨S⟩

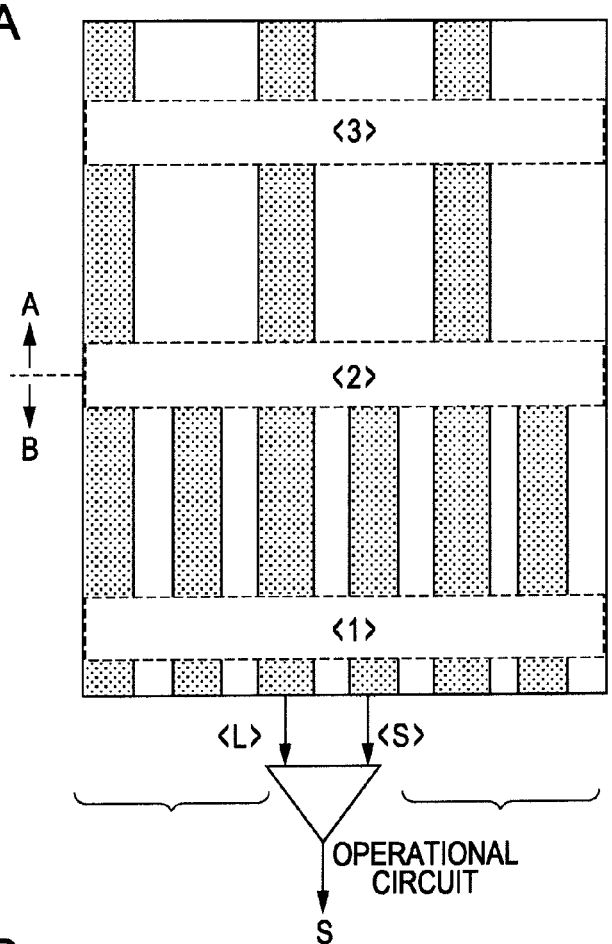

LSL OUTPUT ⟨L⟩

MSL OUTPUT ⟨M⟩

SSL OUTPUT ⟨S⟩

⟨L⟩=S+3N  ⟨M⟩=2S+3N  ⟨S⟩=3S+3N

| POSITION | LONG SENSOR | MIDDLE SENSOR | SHORT SENSOR | Δ(L−M) | Δ(L−S) | Δ(M−S) |
|---|---|---|---|---|---|---|
| ⟨1⟩ | S+3N | 3N | 3N | S | S | 0 |
| ⟨2⟩ | S+3N | S+3N | 3N | 3N | S | S |
| ⟨3⟩ | S+3N | 2S+3N | 3N | −S | S | 2S |
| ⟨4⟩ | S+3N | 2S+3N | S+3N | −S | 0 | S |
| ⟨5⟩ | S+3N | 2S+3N | 3S+3N | −S | −2S | −S |

S: SIGNAL
N: NOISE

▨ PORTION WHERE EFFECTIVE BORDER WIDTH VARIES

☐ USED OPERATION RESULT(OUTPUT EXAMPLE)

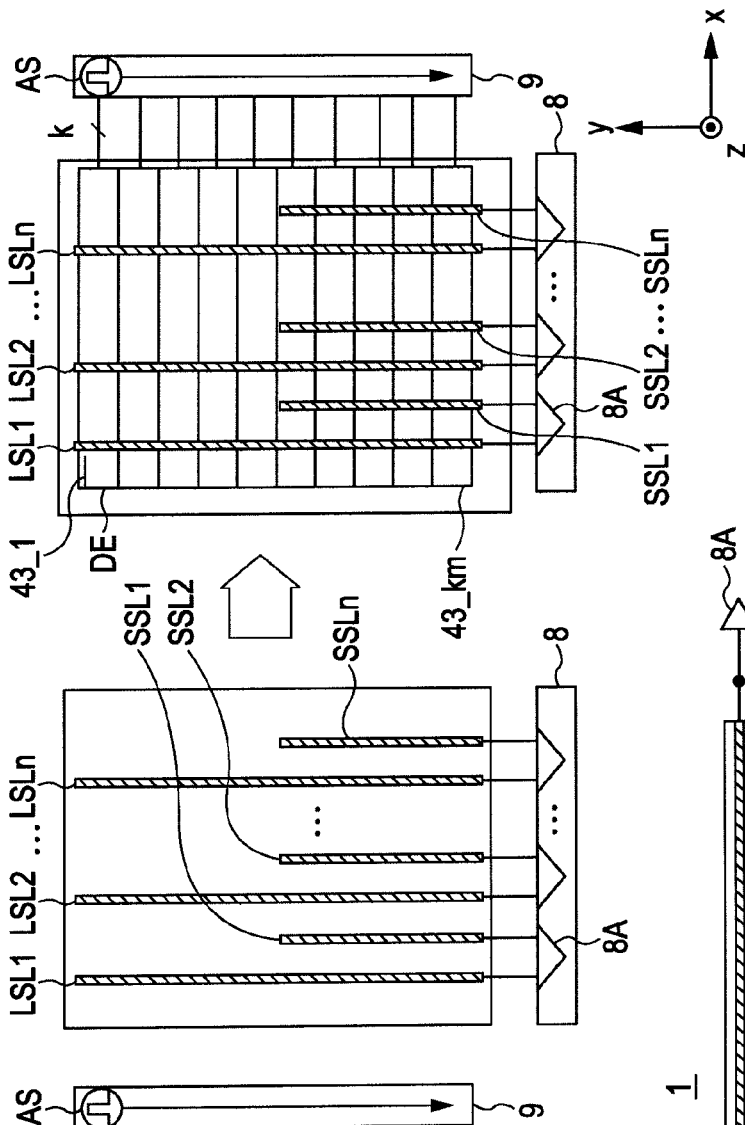
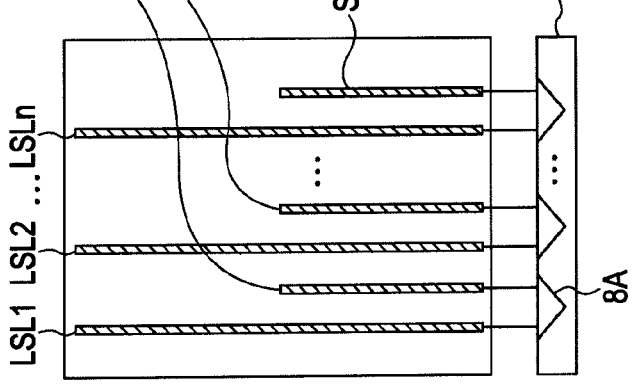
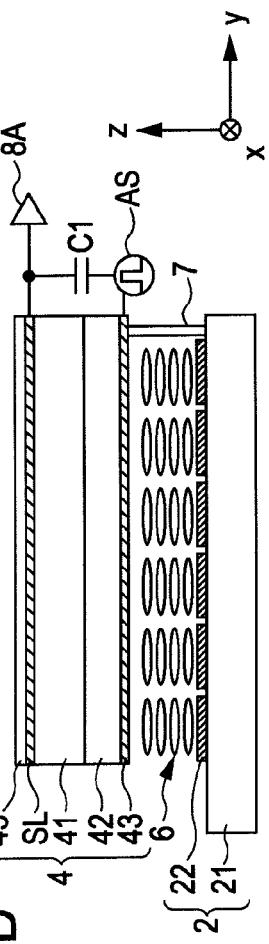
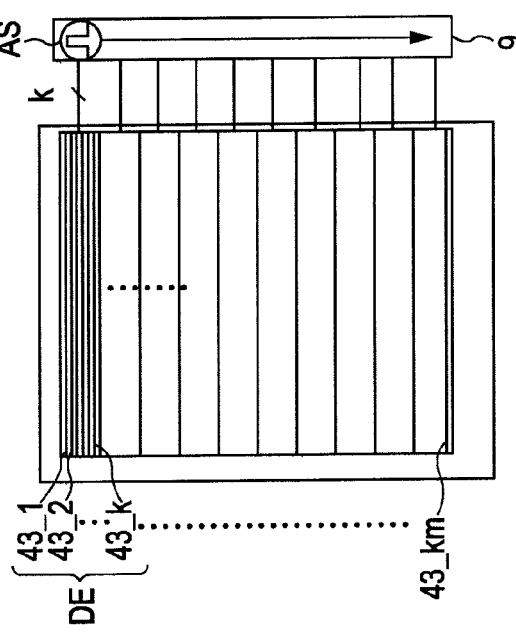

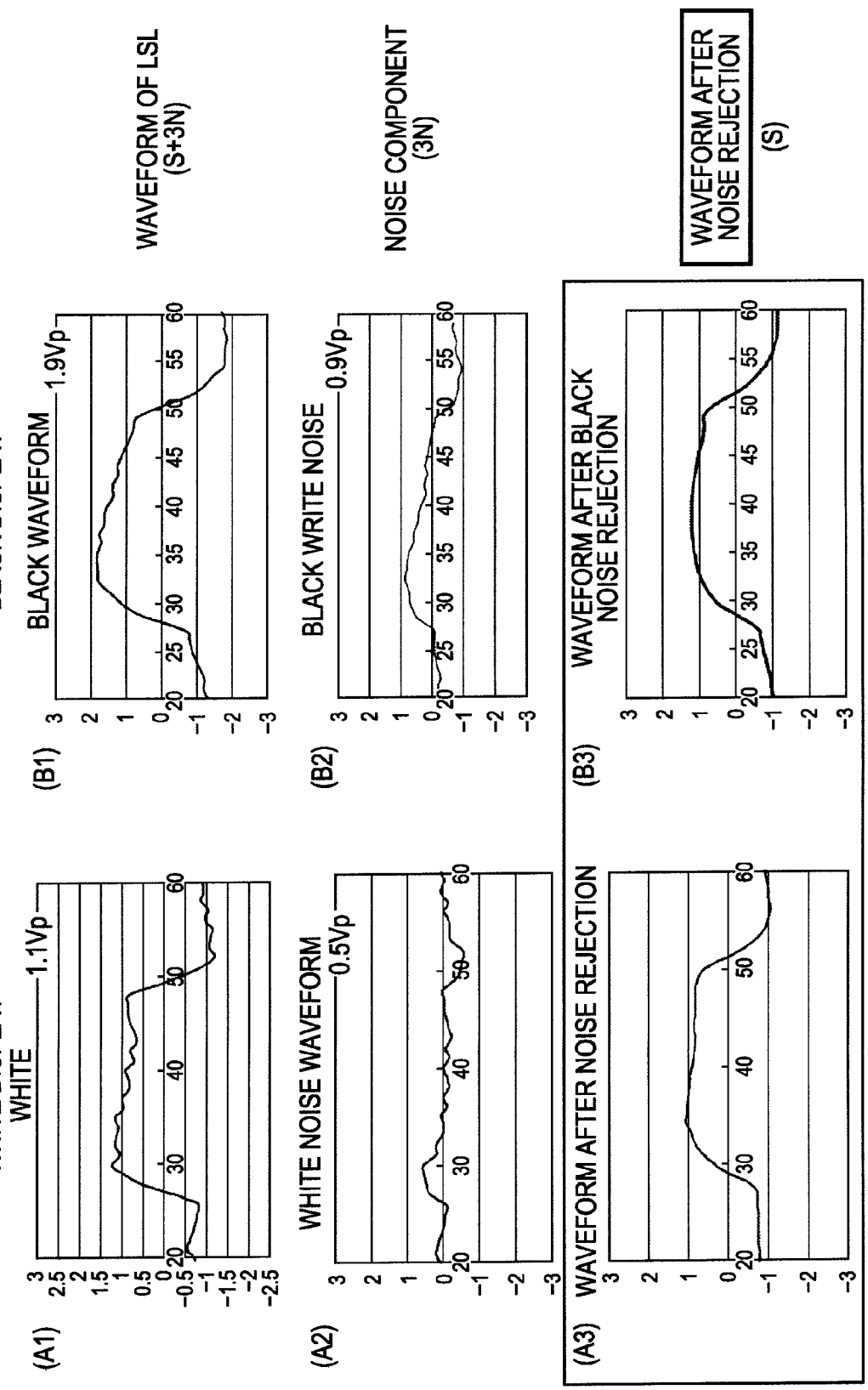

TOUCH DETECTION DEVICE AND DISPLAY DEVICE HAVING TOUCH SENSOR FUNCTION

The present application claims priority to Japanese Patent Application No. JP 2009-155188 filed in the Japanese Patent Office on Jun. 30, 2009, the entire content of which is hereby incorporated by reference.

BACKGROUND OF THE INVENTION

1. Field of the Invention

The present invention relates to a touch detection device for detecting touch or proximity of a user's finger or a pen to a detection surface. In addition, the present invention relates to a display device having a function of the touch detection device (touch sensor).

2. Description of the Related Art

In general, a touch detection device is a device for detecting touch or proximity of a user's finger or a pen to a detection surface.

A display device is known in the art, which allows a user to input information instead of typical buttons by overlappingly forming a touch detection device called a touch panel on a display panel and displaying various buttons as an image on a display surface. When such a display device is applied to a small-sized mobile device, it is possible to obtain various advantages such as a large screen, saving space for a manipulation unit, reduction of components because a display and an arrangement of buttons can be integrated together. As such, generally speaking, the "touch panel" refers to a touch detection device having a panel shape combined with a display device.

It is known that three touch detection types of the touch panel include an optical type, a resistive film type, and an electrostatic capacitance type. Meanwhile, in order to associate an electric variation generated by touch or proximity with positional information, a plurality of wiring lines arranged in a matrix shape combined to determine the position are demanded.

The thickness of the entire display device (e.g., a liquid crystal module) increases when the touch panel is mounted. Particularly, when it is employed in a mobile device, a protection layer for preventing scratches on the touch panel is additionally demanded, thereby further increasing the thickness of the liquid crystal module. This is against a miniaturization trend.

In this regard, for example, Japanese Unexamined Patent Application Publication No. 2008-9750 discloses a touch panel conductive film interposed between a viewer's side panel of the liquid crystal display device and a viewer's side polarization plate disposed in the outer surface thereof. Japanese Unexamined Patent Application Publication No. 2008-9750 proposes a liquid crystal display device having an electrostatic capacitance type touch panel using an external surface of the polarization plate as a touch surface between the touch panel conductive film and the external surface of the polarization plate in order to obtain a thin thickness.

SUMMARY OF THE INVENTION

However, the aforementioned touch panel (touch detection device) or the display device having a touch sensor function has the following disadvantages.

The touch detection device generates an electric variation on the sensor line in response to touch or detection of a detection target object (such as a user's finger or a stylus pen) to the detection surface without distinction of an optical type, a resistive film type, and an electrostatic capacitance type. Such an electric variation in the sensor line is detected in a leading end of the sensor line extending to the outer side from the detection surface. However, since the touch detection device generally demands a plurality of wiring lines in addition to the sensor line, the signal-to-noise (S/N) ratio of the detection signal decreases when the electric potential fluctuation in this wiring lines is overlapped on the sensor line as noise. A pixel circuit usually has an amplification function in an optical type, and an electric variation is relatively large in the resistive film type. On the contrary, in an electrostatic capacitance type touch detection device, the electric variation on the sensor line has a relatively small amplitude, and prevention of degradation of the S/N ratio of the detection signal is important, particularly, in the electrostatic capacitance type touch detection device.

Meanwhile, the display device having a touch sensor function makes progress from simply attaching a touch panel to the external surface of the display panel to forming an electrode for driving the touch sensor inside the display panel to achieve new objectives such as a thinner thickness and cost reduction. Therefore, a wiring line having a large voltage fluctuation functioning as noise source to the sensor line is frequently disposed in proximity of the sensor line in a thickness direction of the panel. Therefore, prevention of degradation in the S/N ratio of the detection signal becomes more important in the display device having a touch sensor function. Although this is a frequent case without distinction of the optical type, the resistive film type, or the electrostatic capacitance type, noise reduction in the sensor line is highly demanded particularly in the electrostatic capacitance type due to the aforementioned reason.

It is desirable to remove a noise component from the detection signal obtained by detecting an electric variation in the sensor line in a touch detection device and a display device having a touch sensor function.

According to an embodiment of the present invention, there is provided a touch detection device including a detection surface, a plurality of sensor lines formed from a plurality of types of wiring lines having a different line capacitance, and a touch detection unit.

The touch detection unit detects an electric variation generated in a plurality of the sensor lines in response to touch or proximity of a detection target object to the detection surface. In addition, the touch detection unit has an operational circuit for generating a detection signal representing the electric variation by performing an operation process using a line capacitance ratio for a plurality of outputs from a plurality of types of the sensor lines neighboring to one another with a different line capacitance.

It is preferable that a plurality of the sensor lines are formed from a plurality of M types of wiring lines that have a different length for each type and are arranged in parallel to one another, and M sensor lines neighboring to one another have a different type. It is preferable that the touch detection unit has the operational circuit provided for each of the M sensor lines that neighbor to one another and have a different type. The operational circuit may have a selector mechanism for sharing between sensor lines.

According to an embodiment of the present invention, the M sensor lines are formed from wiring lines having, the same material, the same thickness, the same width, and a plurality of different types of lengths. In this case, it is preferable that each of the M sensor lines has a length which is a K multiple (where, K=1 to N) of a length L of an elementary sensor line having a shortest length. It is preferable that the operational circuit obtains the detection signal by selecting two sensor lines from the M sensor lines, obtaining a difference of outputs of the two selected sensor lines of which a ratio of lengths is set to k (where, k is a natural number equal to or larger than 2), and removing the obtained difference with (k−1).

According ton an embodiment of the present invention, the touch detection device generates an electric variation on a plurality of the sensor lines in response to touch or proximity of a detection target object (such as a user's finger or a stylus pen) to the detection surface. Typically, since the detection surface is larger than the detection target object, the electric variation is generated in several of a plurality of sensor lines. The sensor line where the electric variation is generated is formed from a plurality of types of wiring lines having a different line capacitance. Therefore, in each sensor line where the electric variation is generated, the electric variation is transmitted to several sensor lines having a different line capacitance and input to the touch detection unit.

The touch detection unit includes an operation circuit. The operational circuit receives a plurality of inputs from a plurality of types of sensor lines that have a different line capacitance and neighbor to one another to perform an operational process. In this operational process, a line capacitance ratio is used, and thus, the detection signal representing the electric variation generated in response to touch or proximity to the detection surface is generated from the operational circuit. The detection signal output from the operational circuit is used to detect presence/absence of the detection target object or a position on the detection surface.

According to an embodiment of the present invention, the display device having a touch sensor function includes a display surface, a plurality of image signal lines, a display function layer, a plurality of sensor lines, and a touch detection unit.

The display function layer changes display of the display surface in response to a voltage applied to a plurality of the image signal lines.

The touch detection unit detects an electric variation generated from a plurality of the sensor lines in response to touch or proximity of the detection target object to the detection surface. In addition, the touch detection unit includes an operational circuit for generating a detection signal representing the electric variation by performing an operation process using a line capacitance ratio for a plurality of outputs from a plurality of types of sensor lines that neighbor to one another and have a different line capacitance.

According to an embodiment of the present invention, the display device having a touch sensor function includes a plurality of pixels a plurality of pixel electrodes, m opposite electrodes, a plurality of sensing electrodes, a display function layer, a write driving scanning unit, an AC driving scanning unit, and a touch detection unit.

A plurality of the pixels are connected to one another by a plurality of scanning lines and a plurality of image signal lines, and each of the pixels has a switch for writing a voltage of corresponding one of the image signal line in response to a voltage applied to corresponding one of the scanning lines.

A plurality of pixel electrodes are provided for each pixel and arranged in a matrix in a planar shape.

The m opposite electrodes are arranged in a planar shape opposite to the pixel electrode, have a pitch length one or more times a pitch length of an arrangement of the pixel electrodes in a scanning direction which is an arrangement direction of one side of the pixel electrode, and are arranged with the same interval in the scanning direction.

A plurality of the sensing electrodes have an electrostatic capacitance between each of the m opposite electrodes. A plurality of the sensing electrodes are formed from a plurality of types of wiring lines having a difference line capacitance.

The display function layer provides an image display function in response to a signal voltage applied between the pixel electrode and the opposite electrode that face to each other.

The write driving scanning unit performs a write operation for writing voltages of a predetermined number of the image signal lines by turning on a predetermined number switches for a predetermined number of the pixel electrodes lined up in the other direction perpendicular to the scanning direction. The write driving scanning unit performs a write operation and repeats a shift operation that sequentially switches a predetermined number of pixel electrodes, which is a write target, in the scanning direction.

The AC driving scanning unit drives, with an AC voltage, s opposite electrodes (where, $1 \leq s < n$) defined from the m opposite electrodes under a condition that opposite electrodes opposite to a predetermined number of the pixel electrodes as a write target are included. In addition, the AC driving scanning unit shifts the s opposite electrodes as an AC driving target in the scanning direction to satisfy the aforementioned condition.

The touch detection unit detects a variation in a voltage applied to the electrostatic capacitance caused by an external capacitance in the side of the sensing electrode. In addition, the touch detection unit includes an operational circuit for generating a detection signal representing a variation in a voltage applied to the electrostatic capacitance by performing an operation process using a line capacitance ratio for a plurality of outputs from a plurality of types of the sensing electrodes that have a different line capacitance and neighbor to one another.

In the two display device having the aforementioned configuration according to an embodiment of the present invention, a plurality of the sensor lines (or sensing electrodes) and the touch detection unit have the same function as that of the aforementioned touch detection device (However, the surface where the detection target object touches or is located in proximity is sometimes referred to as a display surface in the corresponding display device).

The display function layer may neighbor to a plurality of the sensor lines (or a plurality of the sensing electrodes), for example, in a thickness direction of the display device. In this case, a plurality of image signal lines providing a voltage for driving the display function layer also neighbor to a plurality of the sensor lines. Particularly, the image signal lines may extend in the same direction as that of a plurality of the sensor lines (or a plurality of the sensing electrodes). In this case, each of a plurality of sensor lines (or a plurality of sensing electrodes) is influenced by an electric potential variation several neighboring image signal lines, and the electric potentials thereof fluctuate.

In the display device according to an embodiment of the present invention, the operational circuit performs an operation process using a line capacitance ratio for a plurality of outputs from a plurality of types of the sensor lines (or the sensing electrodes) that have a different line capacitance and neighbor to one another. As a result, the electric potential fluctuation component generated by the effect of the aforementioned other wiring lines (e.g., image signal lines) is effectively removed from the detection signal output from the operational circuit.

According to embodiments of the present invention, it is possible to provide a touch detection device capable of removing a noise component from the detection signal obtained by detecting an electric variation in the sensor lines. In addition, it is possible to provide a display device capable of removing from the detection signal a noise component that changes a voltage applied to the electrostatic capacitance of the sensor line (or the sensing electrode).

BRIEF DESCRIPTION OF THE DRAWINGS

FIGS. 3A to 3C illustrate input/output waveforms of the touch sensor unit according to an embodiment of the present invention.

FIGS. 5A to 5C are a top plan view, an equivalent circuit diagram, and an equation illustrating touch sensor detection according to first to third embodiment of the present invention.

FIGS. 7A and 7B illustrate a border position in the touch detection device according to a first embodiment of the present invention and an operation course or an operation result.

FIGS. 11A to 11D are top plan views and a schematic cross-sectional view illustrating an electrode pattern for touch detection of the display device according to a third embodiment of the present invention and connection with the driving circuit.

FIGS. 24A1 to 24B3 are waveform diagrams illustrating a noise suppression effect.

DESCRIPTION OF THE PREFERRED EMBODIMENTS

Figure 1A:
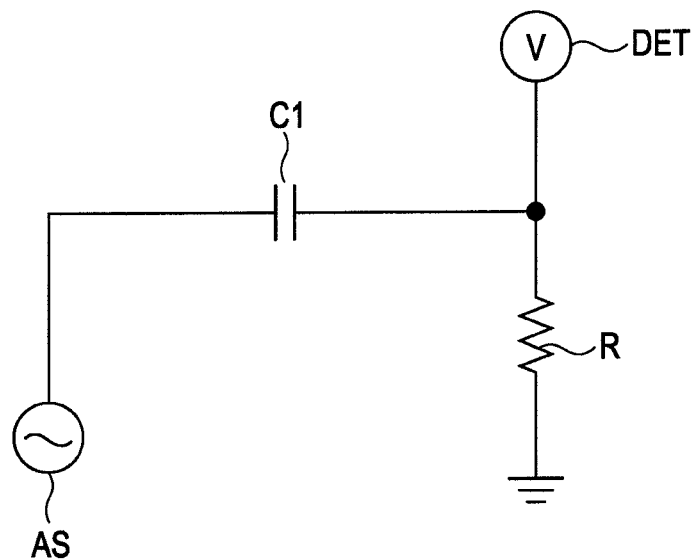
FIGS. 1A and 1B are an equivalent circuit diagram and a schematic cross-sectional diagram illustrating operations of the touch sensor unit according to first to third embodiments of the present invention.

Hereinafter, embodiments of the present invention will be described with reference to the accompanying drawings by exemplifying an electrostatic capacitance type touch sensor and a liquid crystal display device having a touch detection function. In addition, the embodiments of the present invention are applicable to a resistive film type or optical type touch sensor as well. While a liquid crystal display device is described herein the embodiments of, the present invention are applicable to other display devices such as an organic electroluminescence (EL) display device.

The descriptions will be made in the following sequence.
1. First Embodiment: a touch detection device performing an operational process using outputs from double sensor lines
2. First Modification: a case where only the width of the sensor line is different
3. Second Modification: a case where the length and the width of the sensor lines are different (line capacity ratio Kc=2)
4. Third Modification: a case where the length and the width of the sensor lines are different (line capacity ratio Kc≠2)
5. Second Embodiment: a touch detection performing an operational process using outputs from three sensor lines
6. Third Embodiment: a display device performing border scanning
7. Fourth Modification: a matrix arrangement of sensor lines
8. Fifth to Seventh Modifications: a structural example of a liquid crystal display device in a horizontal electric field mode
9. Eighth Modification: an extremely-short sensor line
10. Ninth Modification: arbitrarity of the arrangement sequence of sensor lines
11. Tenth Modification: sharing of sensor lines using an operational circuit
12. Eleventh Modification: a shield layer
13. Noise Sources in Display Devices and Noise Suppression Effect
14. Other Effects 1. First Embodiment

[Basic Configuration and Operations for Touch-Sensing]
First, fundamentals of electrostatic capacitance element type touch-sensing will be described with reference to FIGS. 1A to 3C as assumptions of the first embodiment (common to other embodiments).

Figure 1B:
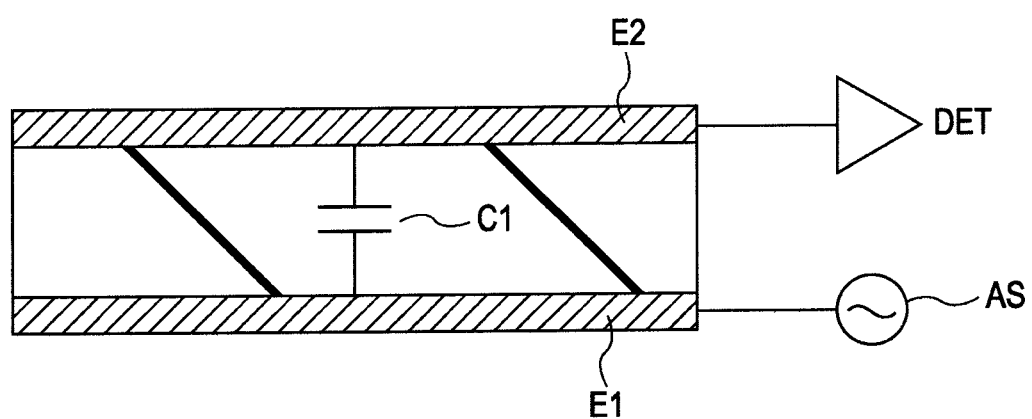
Figure 2A:
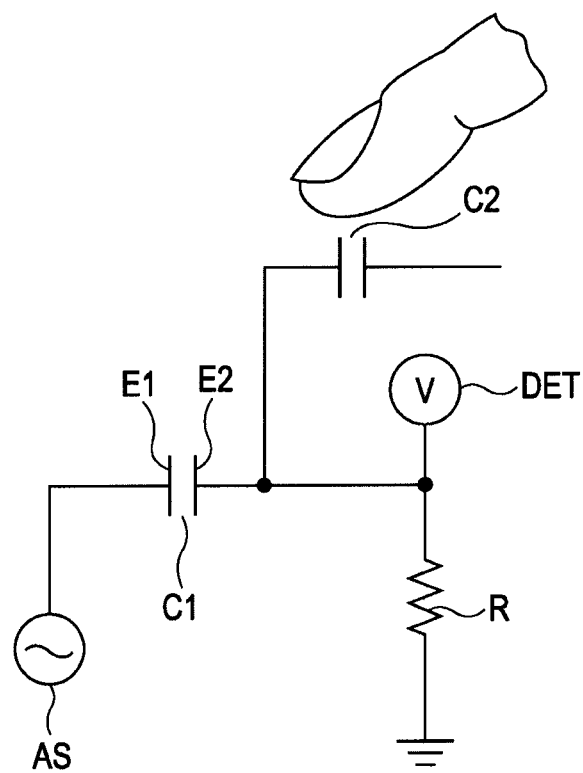
FIGS. 2A and 2B are an equivalent circuit diagram and a schematic cross-sectional diagram when a finger touches or is in proximity of the touch sensor unit of FIG. 1.
Figure 2B:
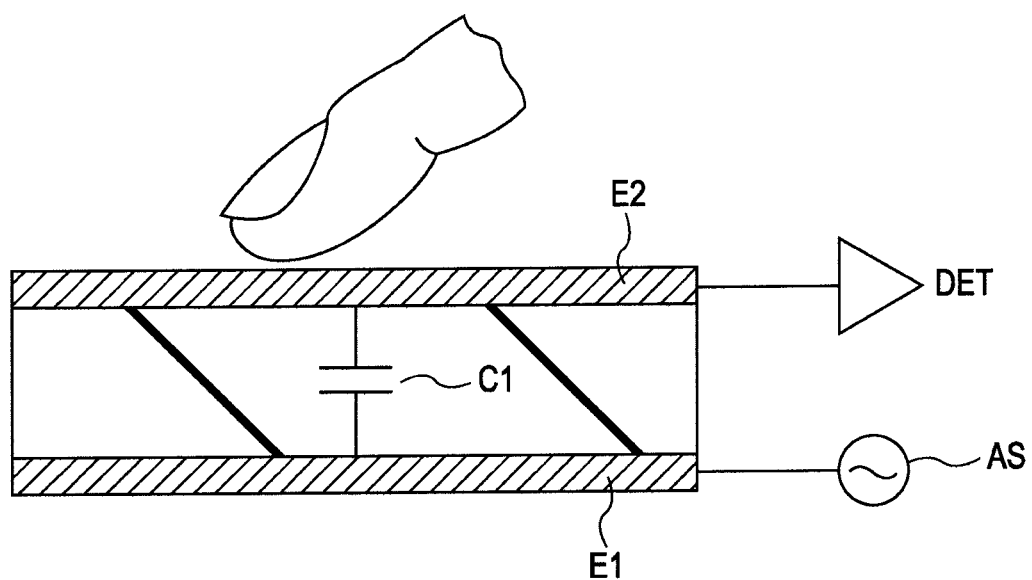

FIGS. 1A and 2A are equivalent circuit diagrams illustrating a touch sensor unit, and FIGS. 1B and 2B are constructional diagrams (schematic cross-sectional views) illustrating a touch sensor unit. Here, FIGS. 1A and 1B illustrate a case where a finger as a sensing target object is not in proximity of the sensor, and FIGS. 2A and 2B illustrate a case where a finger is disposed in proximity of or touches the sensor.

The illustrated touch sensor unit is an electrostatic capacitance type touch sensor and includes capacitance elements as shown in FIGS. 1B and 2B. Specifically, a capacitance element (electrostatic capacitance element) C1 includes a dielectric body D and a pair of electrodes arranged to face each other with the dielectric body D being interposed therebetween, i.e., the driving electrode E1 and the detection electrode E2. As shown in FIGS. 1A and 2A, the driving electrode E1 of the capacitance element C1 is connected to the AC signaling source AS which generates an AC pulse signal Sg. The detection electrode E2 of the capacitance element C1 is connected to the operational circuit 8A. In this case, the detection electrode E2 is grounded via a resistor R so that the DC level is electrically fixed.

An AC pulse signal Sg having a predetermined frequency of, for example, several kHz to several tens of kHz is applied from the AC signaling source AS to the driving electrode E1.

A waveform diagram of the AC pulse signal Sg is illustrated in FIG. 3B. In response to applying the AC pulse signal Sg, a signal (detection signal Vdet) having an output waveform shown in FIG. 3A is generated in the detection electrode E2.

As will be described in detail in another embodiment below, in a liquid crystal display device having a function of the touch sensor within a liquid crystal display panel, the driving electrode E1 corresponds to an opposite electrode (common electrode for a plurality of pixels facing the pixel electrode) for driving liquid crystals. Here, the opposite electrode is subjected to an AC driving, a so-called Vcom-driving for driving liquid crystals. Therefore, according to an embodiment of the present invention, a common driving signal for driving Vcom is generated from a plurality of positions at a timing different from that displayed or simultaneously and also used as an AC pulse signal Sg for driving the driving electrode E1 for the touch sensor.

In the state shown in FIGS. 1A and 1B in which a finger is not touched, the driving electrode E1 of the capacitance element C1 is driven with an AC voltage, and an AC detection signal Vdet is generated in the detection electrode E2 depending on charge/discharge operations. Here, a detection signal thereupon is denoted by an "initial detection signal Vdet0." Since the detection electrode E2 side is grounded from the viewpoint of a DC voltage, but is not grounded from the viewpoint of a high frequency domain, a path for discharging the AC voltage is not provided, and the pulse crest value of the initial detection signal Vdet0 is relatively large. However, after the AC pulse signal Sg rises, and time elapses, the pulse crest value of the initial detection signal Vdet0 gradually falls down due to a loss. FIG. 3C exaggeratedly shows a waveform with a scaling factor. The pulse crest value of the initial detection signal Vdet0 decreases from an initial value of 2.8 V to 0.5 V due to a high frequency loss as some time elapses.

In addition, the waveform of FIG. 3C has no noise, and the waveform having noise and noise rejection will be described later.

From this initial state, as a finger touches or approaches to the detection electrode E2 within an effective point-blank distance, the circuit state changes to be equivalent to a case where the capacitance element C2 is connected to the detection electrode E2 as shown in FIG. 2A. This is because a human body is equivalent to a capacitance element of which one side is grounded from the viewpoint of a high frequency domain. In this contact state, a discharge path for the AC signal is formed through the capacitance elements C1 and C2. Therefore, accompanying with charge/discharge of the capacitance element C1 and C2, AC currents I1 and I2 flows through the capacitance elements C1 and C2, respectively. For this reason, the initial detection signal Vdet0 is voltage-divided according to the unequally defined values of the capacitance elements C1 and C2, and the pulse crest value decreases.

The detection signal Vdet2 shown in FIGS. 3A and 3C are detection signals generated in the detection electrode E2 when a finger touches. Referring to FIG. 3C, it is recognized that the attenuation amount of the detection signal is 0.5 to 0.8 V. The operational circuit 8A shown in FIGS. 1A to 2B detects the attenuation of the detection signal, for example, using a threshold value Vt to detect touch of a finger.

[Schematic Configuration of Touch Detection Device]

Figure 4A:
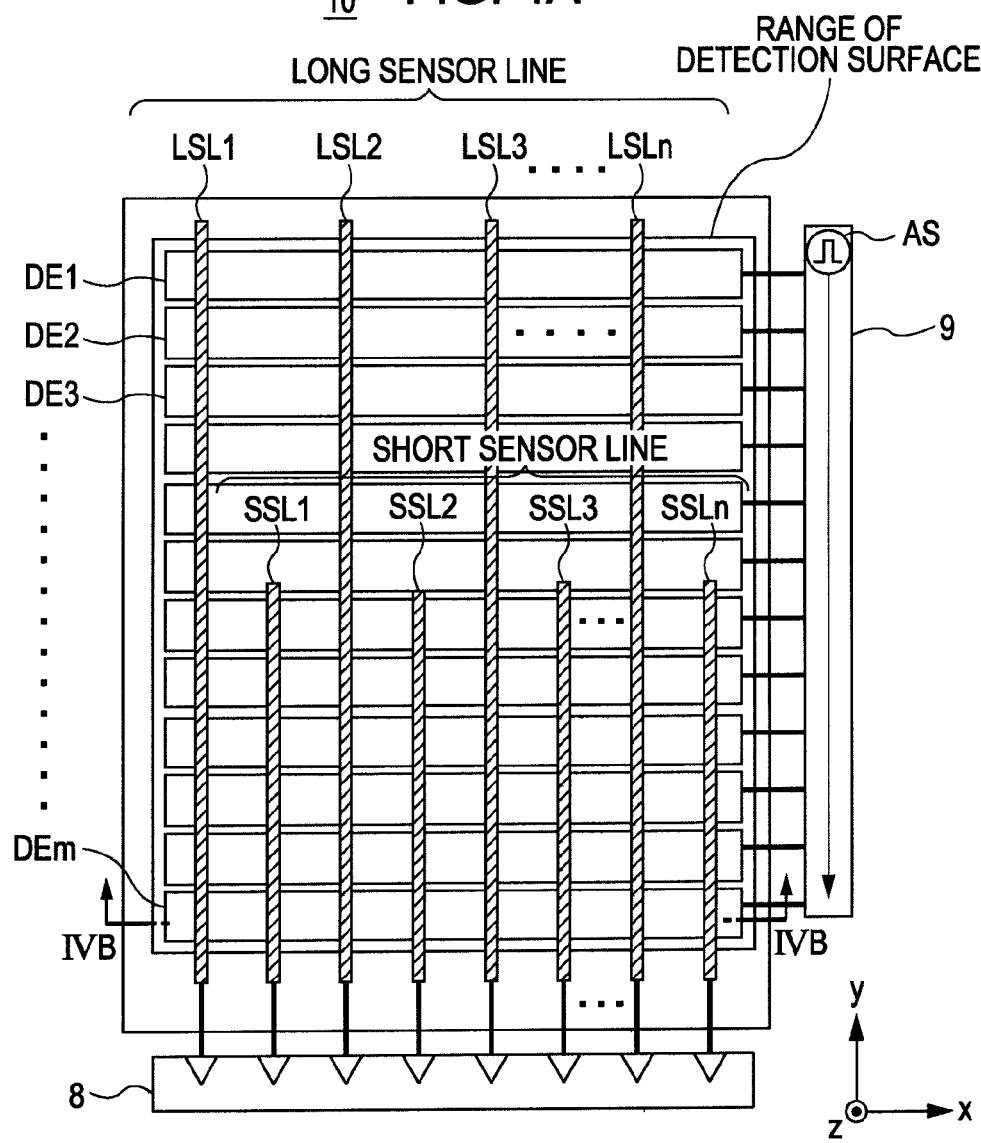
FIGS. 4A and 4B are a top plan view and a schematic cross-sectional view illustrating a configuration of the touch detection device according to first and second embodiments of the present invention.

FIG. 4A is a schematic top plan view illustrating a touch detection device according to an embodiment of the present invention, in which the inner side of the device is penetrated from the detection surface (the surface of the protection layer) by removing the outermost surface of the protection layer. In addition, FIG. 4B is a schematic cross-sectional view along the line IVB-IVB of FIG. 4A.

Figure 4B:
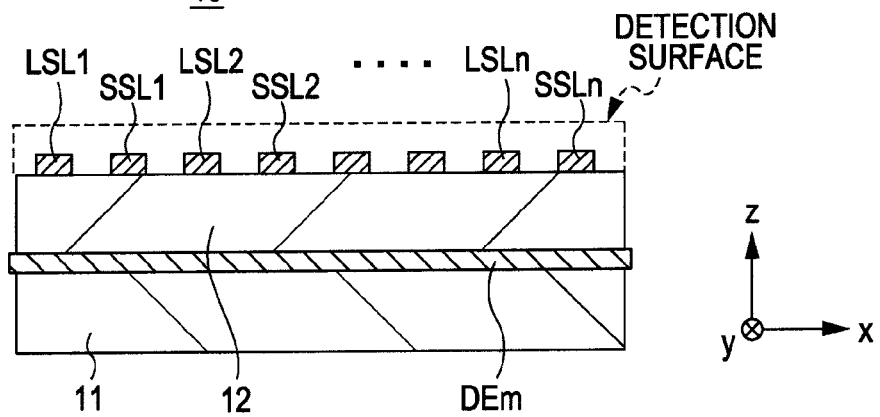

As shown in FIG. 4B, the touch detection device 10 has a driving electrode DEm between the first and second substrates 11 and 12. The surface opposite to the driving electrode DEm side of the second substrate 12, i.e., the surface of the detection surface side, is provided with sensor lines.

As shown in FIG. 4A, the sensor line includes a plurality of lines having two types of lengths extending in a y-direction. Hereinafter, the relatively long sensor line is referred to as "a long sensor line LSL," and the relatively short sensor line is referred to as "a short sensor line SSL." In this example, the long sensor lines LSLi (i=1, 2, 3, ..., n) and the short sensor lines SSLi (i=1, 2, 3, ..., n) are alternately arranged along an x-direction. Although will be described in detail below, a sensor line output is operated for each pair of the neighboring sensor lines having different lengths, i.e., a pair of the long sensor line LSLi and the short sensor line SSLi. In this example, the length of the long sensor line LSLi is a double of the length of the short sensor line SSLi.

Hereinafter, the n long sensor lines LSLi and the n short sensor lines SSLi are collectively called "2n sensor lines SL."

As shown in FIG. 4A, the m driving electrodes having a band shape and extending in an x-direction are arranged with the same pitch in a y-direction. For example, the m driving electrodes DEj (j=1, 2, 3, ..., m) are perpendicular to 2n sensor lines SL(LSL+SSL).

Materials of the first and second substrates 11 and 12 are not particularly limited. However, 2n sensor lines SL is demanded to be capacitively coupled to m driving electrodes DEm, respectively. For this reason, the thickness or the material of the second substrate 12 is defined such that the corresponding capacitive coupling has a predetermined strength. From this viewpoint, the second substrate 12 may be omitted, and an insulator may be interposed between the 2n sensor lines SL and the m driving electrodes DEm.

A scan driving unit 9 is connected to one side end of the m driving electrodes DEj. In addition, a touch detection unit 8 is connected to one side end of the 2n sensor lines SL (LSL+SSL).

The scan driving unit 9 has AC signaling sources AS for each driving electrode (refer to FIGS. 1A to 2B). The activated AC signaling sources AS are sequentially switched in a direction (a scaning direction) represented by an arrow within the block of the scan driving unit 9 of FIG. 4A. Alternatively, the scan driving unit 9 may have a single AC signaling source AS, so that connection between the single AC signaling source AS and one DEj of the m driving electrodes DE1 to DEm is sequentially switched in a scan direction.

As such, the operation of switching the driving electrode receiving the AC signal in practice from one side end to the other side end of the m driving electrodes is called a "scan."

In addition, the function and configuration of the touch detection unit 8 will be described below.

In the present embodiment, a perpendicular arrangement between the driving electrodes and the sensor lines is dispensable, but the shapes or arrangements of each of the sensor lines and each of driving electrodes may be not particularly limited as long as a capacitive coupling therebetween is uniform or nearly uniform within the detection surface.

However, as shown in FIG. 4A, the arrangement of the touch detection unit 8 and he scan driving unit 9 may be readily performed by extracting the sensor lines from one of two perpendicular sides of the detection surface and connecting them to the touch detection unit 8 as well as by extracting the driving electrodes from the other side of the two perpendicular sides and connecting them to the scan driving unit 9. Therefore, the perpendicular arrangement between the driving electrodes and the sensor lines is preferable, but the invention is not necessarily limited thereto.

[Signal Component of Detection Signal]

Figure 5A:
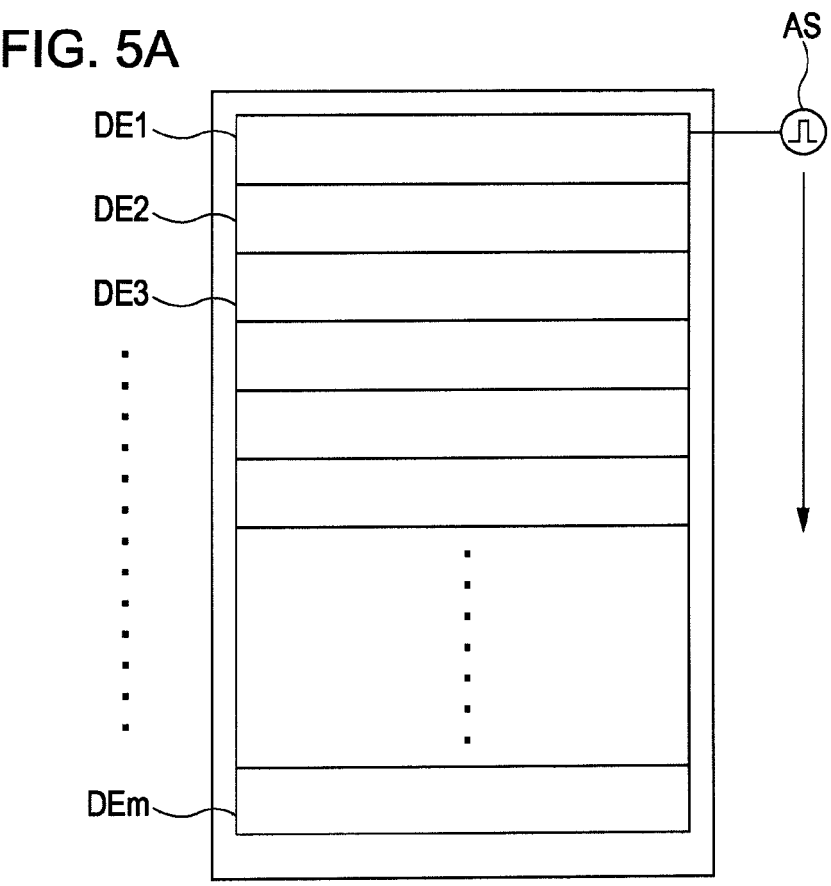
Figure 5B:
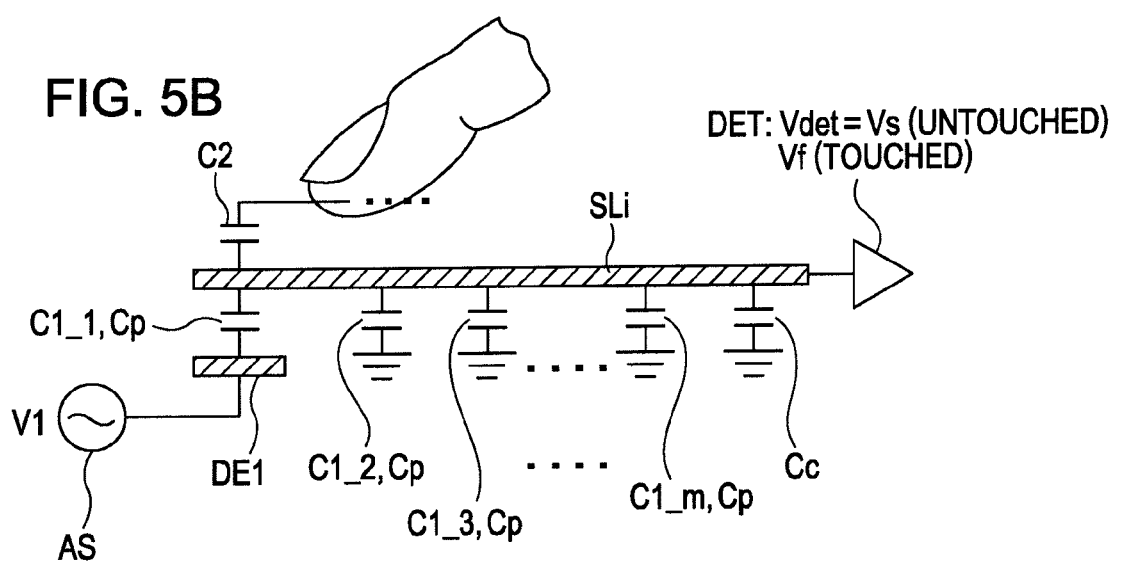

FIG. 5A illustrate a case where the AC signaling source AS drives the first driving electrode DE1 of the m driving electrodes DEj. In addition, FIG. 5B illustrates an equivalent circuit diagram of a touch sensor when an arbitrary single user's finger is in proximity of one of the n long sensor lines LSLi of FIG. 4A at that moment.

As shown in FIG. 5A, the AC signaling source AS is connected to the driving electrode DE1 to drive the driving electrode DE1 with an AC voltage. In this case, the touch sensor is represented as an equivalent circuit shown in FIG. 5B. However, here, each electrostatic capacitance of the capacitance elements C1_1 to C1_m is referred to as "Cp", a capacitance element (a parasitic capacitance) connected in addition to the capacitance elements C1_1 to C1_m is referred to as "Cc", and an effective value of the AC voltage from the AC signaling source AS is referred to as "V1". In this case, the detection signal Vdet detected from the touch detection unit 8 (refer to FIG. 4A) becomes a voltage Vs when a finger does not touch and Vf(<Vs) when a finger touches. In a relationship with FIG. 3, the voltage Vs corresponds to the "initial detection signal Vdet0," and the voltage Vf corresponds to the "detection signal Vdet1." Hereinafter, the voltages Vs and Vf are referred to as sensor voltages.

The sensor voltage Vs in the untouched state is represented as the equation of FIG. 5C. Based on this equation, as the number m of the driving electrodes DE increases, the electrostatic capacitance value Cp decreases accordingly. Therefore, the "mCp" in the denominator in the equation of FIG. 5C becomes nearly constant. In addition, the parasitic capacitance Cc is slightly affected by the number m of the driving electrodes DE, but may be considered nearly constant. For this reason, the remainder of the numerator of the equation of FIG. 5C does not significantly change, but the numerator decreases. Therefore, as the number m of the driving electrodes DE increases, the magnitude of the sensor voltage Vs (the crest value of the detection signal in the untouched state) also decreases. Meanwhile, similar to the sensor voltage Vs, the sensor voltage Vf (the crest value of the detection signal in the touched state) is inversely proportional to "mCp" and proportional to "Cp." This is because the external capacitance C2 added by proximity of a finger is remarkably smaller than the electrostatic capacitance Cp.

Consequently, as the number m of the driving electrodes DE increases, the crest value of the detection signal increases.

On the contrary, if the number m of the driving electrodes DE is small, and the area of a single driving electrode DE1 is large, the crest value of the detection signal increases, but the resolution (a minimum recognizable size of the detection target object) for detecting the size of the detection target object decreases. In addition, accuracy of position detection for detecting the position of the detection target object also increases as the number m decreases. Therefore, if the accuracy for detecting the size or the position of the object increases for high performance, the area of a single driving electrode DE is inevitably reduced. However, as described above, if the number m of the driving electrodes DE increases, and the area of the electrode decreases, the crest value of the detection signal of the touch sensor decreases.

In this example, the electrostatic capacitance Cp at the intersection of the driving electrode DE varies depending on the area of the single driving electrode DE. In other words, as the area (particularly, width) of the driving electrode DE increases, the electrostatic capacitance Cp increases accordingly. In addition, as the area (particularly, the width) of the single sensor line SLi increases, the electrostatic capacitance Cp accordingly increases.

However, if there is noise in the sensor line SLi, the signal component (an average crest value of the sensor voltages Vs and Vf) decreases in comparison with the noise component of the detection signal Vdet. Therefore, the S/N ratio of the detection signal Vdet decreases. The S/N ratio decreases as the number m of the driving electrodes DE increases, and the width of the single driving electrode DE decreases. In addition, as the magnitude of the noise component (the amount of noise) approaches to the signal component, it is difficult to apply noise separation technologies. Particularly, if the noise component periodically fluctuates, and the period thereof is close to the period of the detection signal, it is further difficult to separate the noise.

Since there is a tradeoff between the sensitivity (the resolution of the size of the detection object or the position detection accuracy) of the touch sensor and the S/N ratio of the detection signal Vdet, it is difficult to improve both properties even when the noise separation technology such as a noise filter is applied.

FIGS. 5A and 5B illustrate a case where the intersection between the first driving electrode DE and the long sensor line LSLi is operated, but is similarly used to describe a case of driving the short sensor line SSLi here.

Since the long sensor lines LSLi (refer to FIG. 4A) intersect with all of the m driving electrodes DE, the denominator of the equation of FIG. 5C also becomes "mCp+Cc" in this case. On the contrary, the number of intersections between the short sensor lines SSLi and the driving electrodes DE (refer to FIG. 4A) is approximately a half of the number of intersections between the long sensor lines LSLi and the driving electrodes DE. Therefore, the denominator of the equation of FIG. 5C becomes "mCp/2+Cc." Here, it is assumed that the parasitic capacitance Cc is sufficiently smaller than a total coupling capacitance, i.e., "mCp" or "mCp/2." Under this assumption, the signal component (an average crest value of the sensor voltages Vs and Vf) of the detection signal Vdet output from the short sensor line SSLi becomes approximately a double of that of the long sensor line LSLi.

In addition, the fact that the signal component of the detection signal Vdet of the short sensor line becomes a double of that of the long sensor line is concluded under the assumption (hereinafter, referred to as a first assumption) that the parasitic capacitance Cc is sufficiently smaller than the total coupling capacitance (mCp, mCp/2).

On the contrary, it is assumed that the parasitic capacitance Cc of each sensor line is sufficiently larger than the total coupling capacitance (mCp, mCp/2) (hereinafter, referred to as a second assumption). Under the second assumption, while the parasitic capacitance Cc is dominated in the denominator of the equation of FIG. 5C, the parasitic capacitance Cc is proportional to the line capacitance and thus, decreases as the line capacitance decreases. That is, the parasitic capacitance Cc of the short sensor line is nearly halved from the parasitic capacitance Cc of the long sensor line. Therefore, the conclusion that the signal component of the detection signal Vdet of the short sensor line becomes a double of that of the long sensor line is also similarly extracted from the second assumption.

Meanwhile, a halfway assumption between the first and second assumptions, i.e., a case that either the total coupling capacitance (mCp, mCp/2) of the denominator of the equation of FIG. 5C or the parasitic capacitance element Cc is not negligible will be described (a third assumption). Also in this case, it is possible to readily infer that the denominator of the equation of FIG. 5C of the short sensor line is a half of that of the long sensor line, and the conclusion does not change.

Consequently, if the length of the short sensor line is set to a half (½) of the length of the long sensor line, the signal component of the short sensor line becomes a double of that of the long sensor line. This is also obtained under the assumption that the long and short sensor lines are formed in the wiring layer having the same width, the same thickness, and the same material.

Generally, if the wiring layer has the same thickness and the same material, the line capacitance is proportional to the length. Therefore, generally speaking, it could be said that, if the long and short sensor lines have the same width, the same thickness, and the same material, the ratio of the length nearly corresponds with the line capacitance ratio Kc, and the magnitude (the crest value) of the signal component of the detection signal is defined to be nearly inversely proportional to the line capacitance ratio Kc.

According to an embodiment of the present invention, the line capacitance includes a coupling capacitance with other conductive portions and the parasitic capacitance in addition to the capacitance of the wiring layer itself.

2. First Modification

Here, another embodiment (modification) of changing the line capacitance ratio Kc will be described.

In the first modification, both the sensor lines have the same length, the same thickness, and the same material, but the width is different.

For example, a second sensor line having a width doubled by the first sensor line is considered. In this case, the line capacitance ratio Kc of the second sensor line against the first sensor line is approximately 2, and the denominator of the equation of FIG. 5C of the second sensor line becomes approximately a double of that of the first sensor line. In this case, if the widths of the m driving electrodes DEj are constant, the electrostatic capacitance Cp of the second sensor line becomes a double of that of the first sensor line. Therefore, in the first modification, the signal component (the crest value) of the detection signal becomes nearly the same between the first and second sensor lines.

3. Second Modification

In the second modification, both the sensor lines have the same thickness and material, but the length and the width are different.

For example, as shown in FIGS. 4A and 4B, it is assumed that the length of the short sensor line is a half (½) of the length of the long sensor line, and the width of the short sensor line is a half (½) of the width of the long sensor line. In this case, the denominator of the equation of FIG. 5C of the short sensor line becomes a quarter (¼) of that of the long sensor line (the line capacitance ratio Kc is 4 or ¼). In addition, the electrostatic capacitance Cp of the short sensor line becomes approximately a half (½) of that of the long sensor line. Therefore, in the second modification, the signal component (the crest value) of the detection signal output from the short sensor line becomes approximately a double of the signal component (the crest value) of the detection signal output from the long sensor line.

4. Third Modification

In the third modification, similar to the second modification, both the sensor lines have the same thickness and the same material, but the length and the width are different.

However, it is assumed that, the length of the short sensor line is a half of the length of the long sensor line as shown in FIGS. 4A and 4B, but the width of the short sensor line is a double of the width of the long sensor line. In this case, the denominator of the equation of FIG. 5C does not change between the short sensor line and the long sensor line (the line capacitance ratio Kc is 1). In addition, the electrostatic capacitance Cp of the short sensor line becomes approximately a double of that of the long sensor line. Therefore, in the third modification, the signal component (the crest value) of the detection signal output from the short sensor line is approximately a double of that of the signal component (the crest value) of the detection signal output from the long sensor line.

In FIGS. 4A and 4B, in the first to third modifications, a scaling factor was set to 2 by changing only the length, only the width, or both the length and the width of one of the sensor lines with respect to the other sensor line. However, the scaling factor may be 3 or any other natural number. As a result, it is possible to change the signal component of detection signal of one of the sensor lines with respect to the signal component of the detection signal of the other sensor line as much as double, triple, or any natural number of times.

Inversely speaking, this means the signal component of the detection signal of one sensor line varies with respect to the signal component of the detection signal of the other sensor line as much as the same, a half, one-third, . . . , or an inverse of any natural number of times.

In FIGS. 4A and 4B, in the first to third modifications, while at least one of the length and the width changes, a parameter for changing the line capacitance ratio Kc is also associated with the material and the thickness of the wiring layer in addition to the length and the width. Therefore, the line capacitance ratio Kc may change between both the sensor lines by changing only the material or the thickness of the wiring layer for forming the sensor lines or combining them with other parameters.

[Noise Component]

The noise component is differently superimposed on the sensor lines depending on the noise source assumption.

The touch detection device itself may be made thinner with high performance and may be mounted on another electronic device (for example, a display device illustrated in the embodiment described below). Therefore, other lines at which an electric potential fluctuates may be arranged under the sensor lines of the touch detection device, and the distance between the sensor lines and those other lines tends to decrease as the touch detection device is made thinner.

When a wiring line, where an electric potential fluctuates, as a noise source is arranged in parallel with the sensor line, the magnitude of the noise component (noise amount) is defined by a strength of the capacitive coupling as a main parameter associated with the length and the width as well as a thickness or a material thereof.

Here, since noise is superimposed on the sensor line through a parasitic capacitance Cc, the noise amount increases as the parasitic capacitance Cc increases. However, as described above, since the parasitic capacitance Cc is proportional to the line capacitance, it is also envisaged that the noise amount increases as the line capacitance increases from this viewpoint. On the other hand, as the line capacitance of the sensor line increases, a variation of the electrical potential on the sensor line is hardly generated by the noise. For this reason, even when the line capacitance ratio Kc changes, the noise amount hardly changes.

For example, in a case where the width of the sensor line is equal, and the length is halved (line capacitance ratio Kc=2 or ½), the line capacitance (electrostatic capacitance Cp) is halved as the length is halved, and the parasitic capacitance Cc is accordingly halved. For this reason, even when the length of the sensor line changes, the noise amount hardly changes.

In a case where the length of the senor line is equal, and the width is halved (line capacitance ratio Kc=2 or ½), the line capacitance (electrostatic capacitance Cp) is halved as the width is halved, and the parasitic capacitance Cc is halved accordingly. For this reason, even when the width of the sensor line changes, the noise amount hardly changes.

Meanwhile, in a case where the wiring line of the noise source traverses the width direction of the sensor line, the magnitude of the noise component is defined by a strength of the capacitive coupling as a main parameter associated with the width as well as a thickness or a material thereof. Even in this case, since the noise is superimposed on the sensor line via the parasitic capacitance Cc, it is envisaged that the parasitic capacitance Cc increases as the line capacitance increases as described above. However, since the line capacitance increases as the width increases, a variation of the electrical potential of the sensor line is hardly generated by the noise, and also in this case, the noise amount hardly changes even when the line capacitance ratio Kc changes. For example, in a case where the wiring lines traversing the long sensor line LSLi and the short sensor line SSLi having the same width as shown in FIGS. 4A and 4B function as a noise source, the noise components having the same strength are superimposed on these two sensor lines.

The noise source may be incoming electromagnetic waves from the outer side. In this case, the sensor line functions as an antenna for generating noise.

In this case, the magnitude of the noise component is defined by a strength of the capacitive coupling as a main parameter associated with a length or a width as well as a thickness or a material thereof. In this case, since the noise superimposed on the sensor line does not include a parasitic capacitance Cc, the noise component tends to be proportional to the line capacitance. Therefore, in this case, the incoming noise amount depends on the line capacitance ratio Kc.

Based on the descriptions above, while some types of noise sources may be associated with the line capacitance ratio Kc (e.g., incoming noise), it could be assumed that, when a wiring line having a fluctuating electric potential is in proximity of the sensor line, inductive noise from this wiring line is dominant, and the proportion of the incoming noise against the entire noise amount is negligible. Therefore, the accuracy of a noise rejection operation is not degraded even by assuming that noise amount does not depend on the line capacitance ratio Kc and is nearly constant when the noise component is removed by an operational process using the line capacitance ratio Kc.

Although the operation method is not shown in detail, in a case where the noise source, of which the noise amount is associated with the line capacitance ratio Kc, such as the incoming noise, is not negligible, it is possible to perform a noise rejection operation in which the noise amount is not constant as well.

[Noise Rejection Operation]

Next, by focusing on a case where the signal component of the detection signal is different depending on the length of the sensor line, a noise rejection operation using the line capacitance ratio Kc obtained at that time will be described.

Figure 6A:
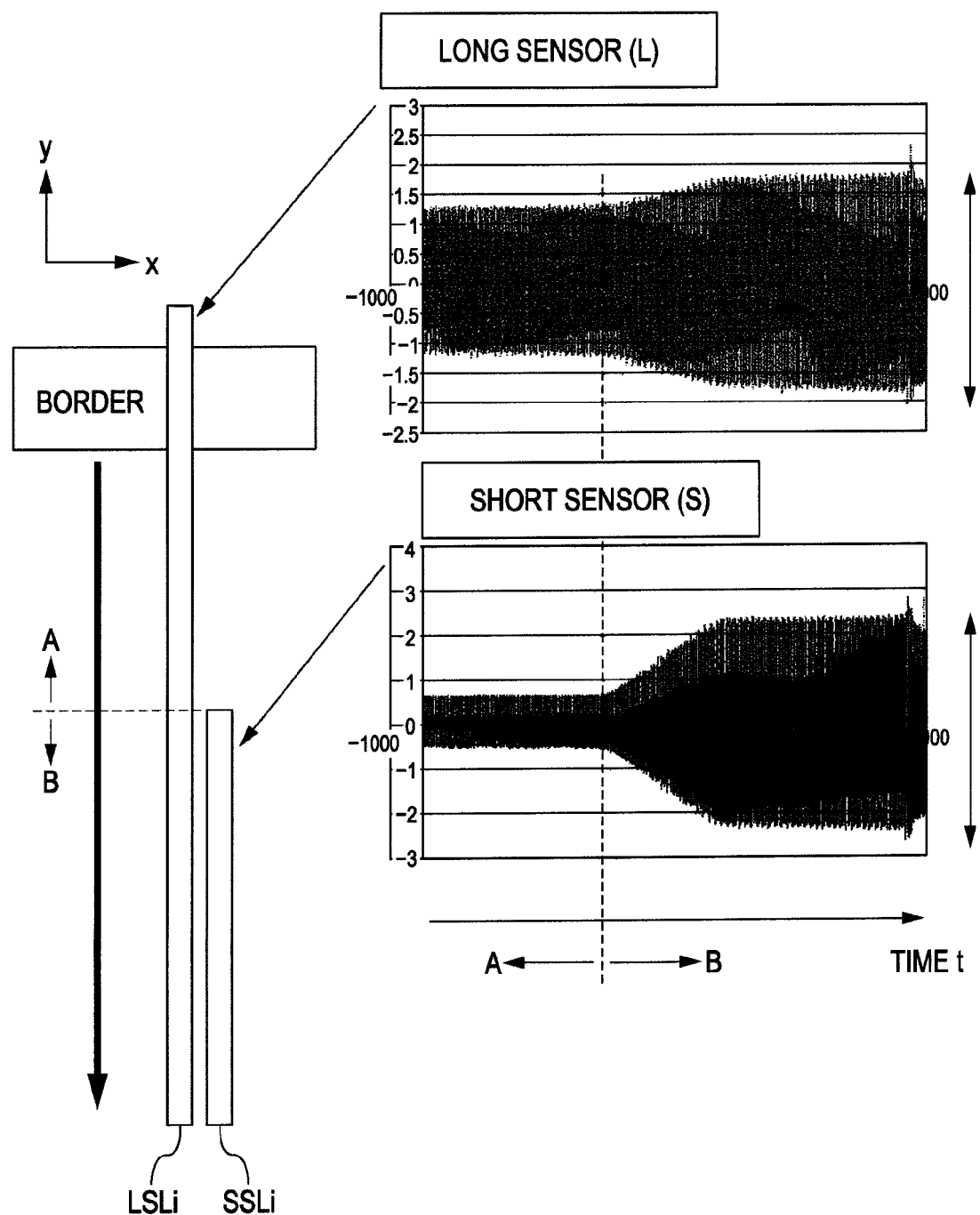
FIGS. 6A to 6C are a waveform diagram of the long sensor output and the short sensor output, a schematic diagram of components, and an operational example.

FIG. 6A illustrates waveforms of a long sensor output and a short sensor output.

In FIG. 6A, the waveform diagram denoted by "Long Sensor(L)" represents the output waveform of the long sensor line LSLi. In addition, the waveform diagram denoted by "Short Sensor(S)" represents the output waveform of the short sensor line SSLi. In these output waveforms, the abscissa denotes changes of time t [μs], and the ordinate denotes an electric potential fluctuation in the sensor line output with respect to a reference electric potential (for example, 0 [V]). In the abscissa, the time is ranged from 0 to 16.67 [msec]. While the sensor line output also fluctuates in an AC manner as a result of driving the driving electrode with an AC voltage, a period of the electric potential fluctuation is significantly small with respect to the abscissa of FIG. 6A, and thus, a mountain of the AC waveform is represented as a line.

The area denoted by a border in FIG. 6A represents the area seen from a detection surface corresponding to the driving electrode DE activated by or connected to the AC signaling source AS in FIG. 4A or 5A.

Figure 6B:
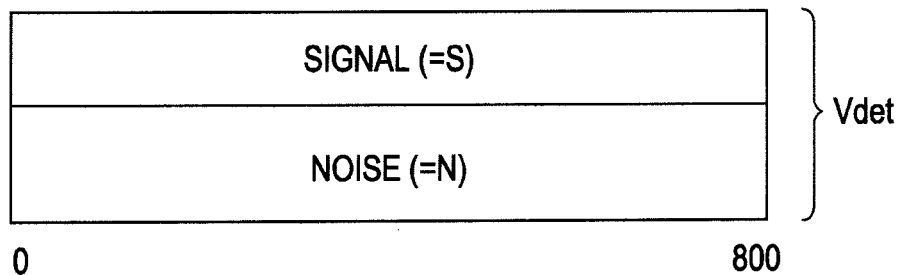
Figure 6C:
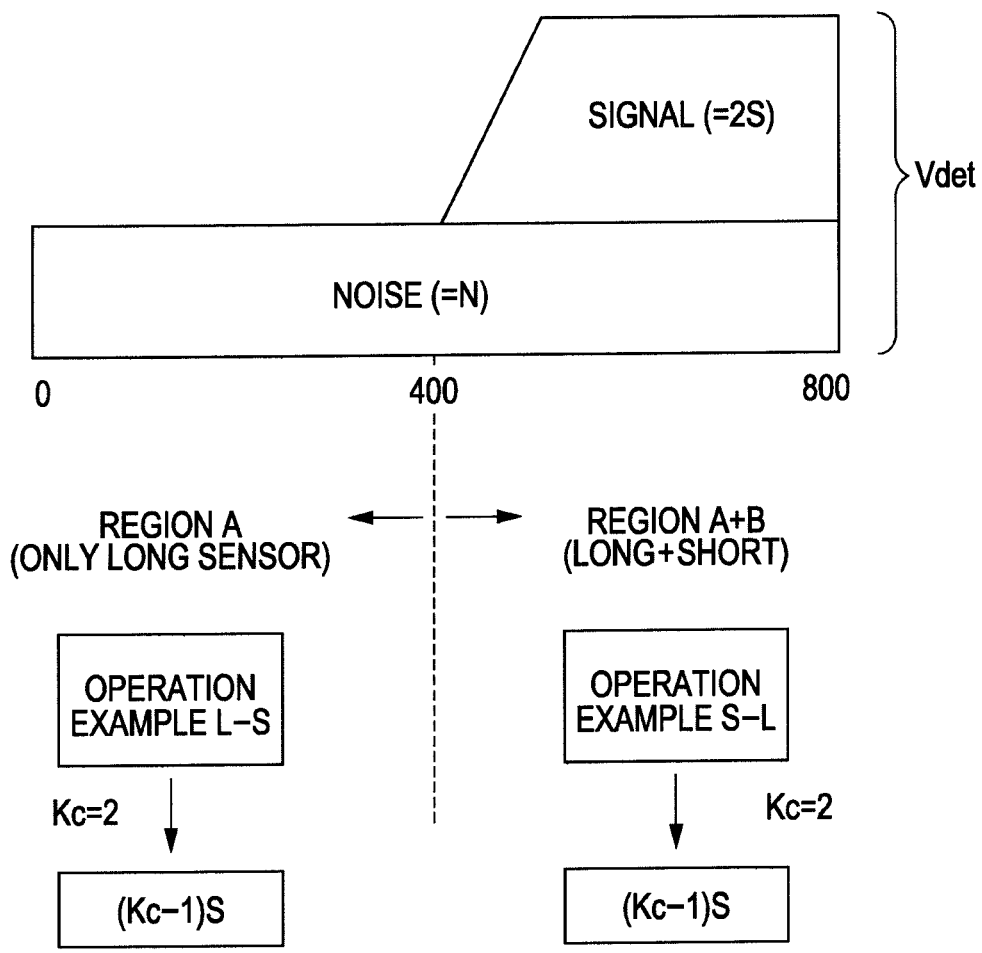

FIG. 6B schematically illustrates a long sensor line output corresponding to the waveform diagram "Long Sensor(L)". FIG. 6C schematically illustrates a short sensor line output corresponding to the waveform diagram "Short Sensor(S)".

Here, the width of the border in the y-direction is set to be larger than the movement pitch. This may be achieved by increasing the division number of the driving electrode DE shown in FIG. 5A but setting the number of the driving electrodes DE driven by the AC signaling source AS in a single time to a plural number. That is, the number of the driving electrodes DE driven in a single time is set to, for example, a few or several tens, and the pitch of shift during the scanning is set to, for example, the number corresponding to a single driving electrode. In addition, while such a method of scanning using plural driving electrodes with a narrow pitch is dispensible in the present embodiment, such a method is employed in FIGS. 6A to 6C.

The numerals "0" and "800" shown in FIGS. 6B and 6C represent shift pitch numbers in the y-direction. "0 to 400" corresponds to an area A, and "400 to 800" corresponds to an area B with respect to the center "400" thereof.

The border moves from the state shown in FIG. 6A along the arrow direction.

In the scanning of the area A where only the long sensor line LSLi intersects with the border, the detection signal Vdet having the waveform shown as "Long Sensor(L)" is output from the long sensor line LSLi. In the scanning of the area A, the long sensor line output is obtained by defining that one time of the signal component S and one time of the noise component are overlapped as shown in FIG. 6B. In this case, since the short sensor line output does not yet intersect with the border as shown in FIG. 6C, only the noise component is output.

Here, as described in the [Noise Component] section, since it can be assumed that the noise component does not depend on the line capacitance ratio Kc and is constant, the noise component of the short sensor line output is also represented as one time (=N).

In FIG. 6C, there are illustrated an operational formula (in the case of Kc=2) for obtaining the signal component S and a general formula using the line capacitance ratio Kc. As such, it is possible to obtain the signal component S with the noise component being removed through an operation by using the line capacitance ratio Kc from the outputs from two sensor lines having a different length.

FIG. 7B illustrates a table representing the operation result from the detection signal obtained during the scanning of three positions based on the operational formula of FIG. 6C. FIG. 7A illustrates a relationship between the positions <1> to <3> and the sensor line.

In the operational circuit, the detection signal is sequentially input in the order of the position <1> where the border is positioned in the area B, the position <2> where the border width center is positioned in the boundary between the areas A and B, and the position <3> where the border is positioned in the area A. The operational circuit obtains the signal component S by inputting the output of the long sensor line LSLi and the output of the short sensor line SSLi and performing an operation using the difference (Delta) thereof and the line capacitance ratio Kc.

As shown in FIG. 7B, the operational circuit obtains only the difference (Delta) in the detection time range corresponding to the position <3> and performs an operation using the operational formula "(Delta)/(Kc−1)" based on the difference (Delta) and the line capacitance ratio Kc in the detection time range corresponding to the position <1>. In addition, in the detection time range corresponding to the position <2>, since the difference (Delta) becomes zero in the case of, for example, Kc=2, and the operation may not be possible, the operation is not performed in the intermediate detection time range.

In addition, a clock signal synchronized with the the detection scanning, i.e., the shift operation of the border of FIG. 6A is input, and the detection time ranges are determined based on the clock signal.

Alternatively, since the difference (Delta) directly becomes the signal component S if Kc=2, the operational circuit may obtain the signal component S by sampling the detection signal Vdet at the detection timing corresponding to the position <1> or <3>.

In addition, if the line capacitance ratio Kc is equal to or larger than 3, the operational circuit may obtain the signal component S by sampling the detection signal Vdet at the detection timing corresponding to the position <3>. Meanwhile, in the case of the detection timing corresponding to the position <1>, a general formula of the difference (Delta) becomes "(Kc−1)(Delta)". Therefore, the operational circuit can obtain the signal component S by computing "(Delta)/(Kc−1)".

The output from the operational circuit obtained as described above is provided to a process of determining presence/absence of the detection target object or a position thereof using a circuit (not shown) (including either an internal circuit or an external circuit of the corresponding position detection device).

In addition, in the operation for two sensor lines having the same length and a different width, in the case of the capacitance formula, the signal component of the detection signal is sometimes equal even when the width is different as described in the first modification, and the noise component is also sometimes equal as described in the [Noise Component] section. In that case, even when the widths are different, the ratio between the signal component and the noise component does not change. Therefore, the operation using the line capacitance ratio Kc as in the aforementioned case where the lengths are different may not be possible.

However, in a case other than the capacitance formula and also in the capacitance formula, the noise component may change depending on the line capacitance ratio Kc, for example, as in the the incoming noise. In this case, although detailed descriptions are omitted, it is possible to obtain the signal component S using the difference of the ratio between the signal component and the noise component, similar to the case where the lengths are different.

[Configuration Examples of AC Signaling Source and Operational Circuit]

Figure 8A:
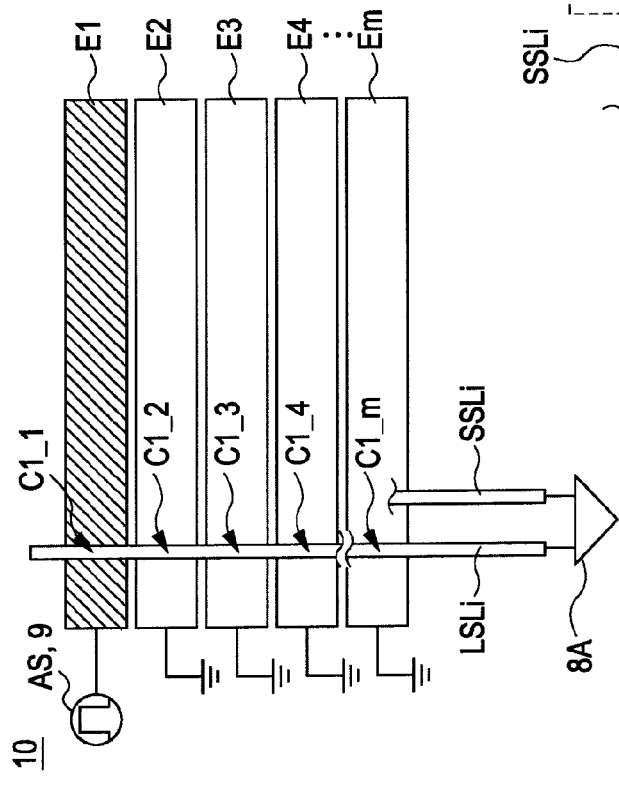
FIGS. 8A and 8B illustrate a diagram illustrating a border scan position and an exemplary circuit diagram of the AC signaling source and the operation circuit.
Figure 8B:
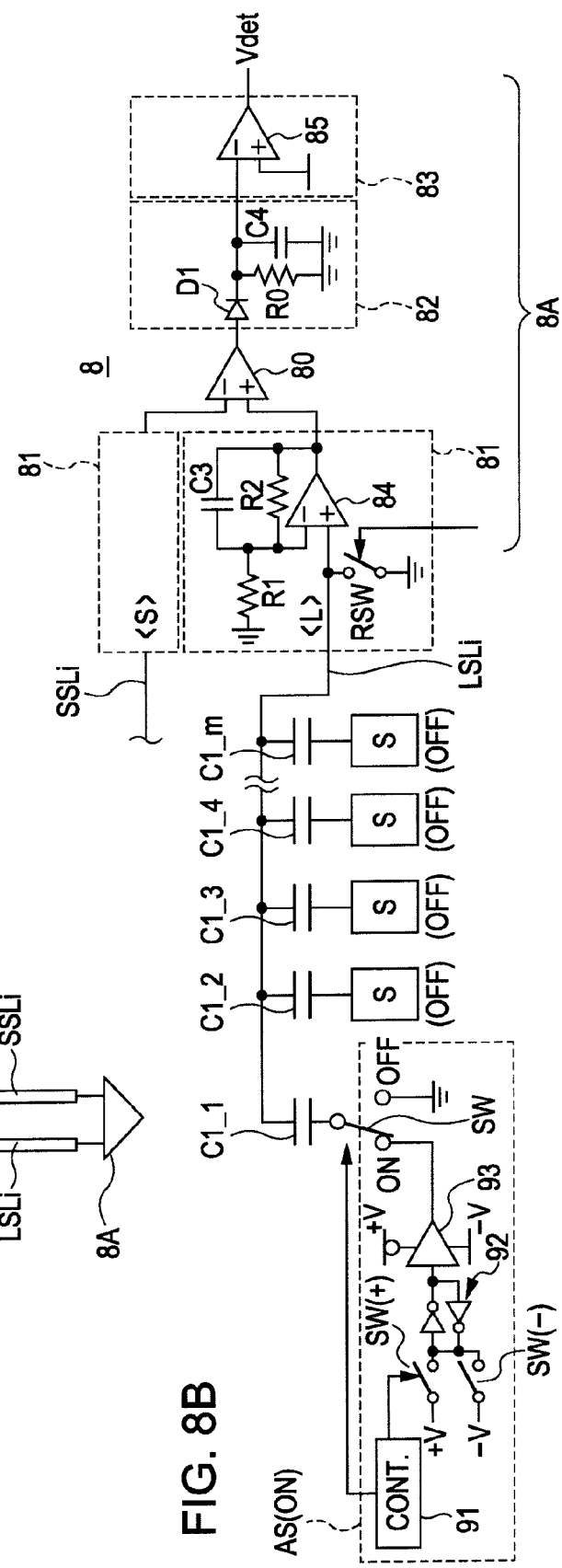

FIG. 8B is a circuit diagram illustrating configuration examples of the operational circuit 8A and the AC signaling source AS of the touch detection unit 8. FIG. 8A illustrates a driving position of the driving electrode.

In FIG. 8A, the hatched driving electrode DE1 is connected to and activated by the AC signaling source AS, and other unselected driving electrodes DE2 to DEm are maintained in a ground electric potential GND. The state that the driving electrode is selected and activated is referred to as an ON state, and the unselected state is referred to as an OFF state. FIG. 8B illustrates a circuit diagram of a single operational circuit 8A and an AC signaling source AS of the touch detection unit 8 connected to any long sensor line LSLi (i=1 to n) intersecting with such a driving electrode group. The operational circuit 8A is a circuit for performing a predetermined operation between the LSL output and the SSL output by also inputting the short sensor line SSLi (i=1 to n) neighboring to the long sensor line LSLi.

The (electrostatic) capacitance elements C1_1 to C1_m are formed in each intersection between the long sensor line LSLi and the driving electrode Dej (j=1 to m).

The AC signaling source AS shown in FIG. 8B includes a control unit 91, two switches SW(+) and SW(−), a latch circuit 92, a buffer circuit (waveform shaping unit) 93, and an output switch SW. The control unit 91 is a circuit for controlling the output switch SW and two switches SW(+) and SW(−) switching between the positive voltage V(+) and the negative voltage V(−). The control circuit 91 may not be provided in the AC signaling source AS but be substituted with an external CPU.

The switch SW(+) is connected between the positive voltage V(+) and the latch circuit 92, and the switch SW(−) is connected between the negative voltage V(−) and the input of the latch circuit 92. The output of the latch circuit 92 is connected to the ON-side node of the output switch SW through the buffer circuit 93. The buffer circuit 93 is a circuit for compensating for the input electric potential and outputting it to the positive voltage V(+) and the negative voltage V(−). Here, the output switch SW is controlled by the control unit 91 so as to control whether the corresponding AC signaling source AS is turned on (selected or activated) or connected to the ground (inactivated). Since the control unit 91 is synchronized with the control of other AC signaling sources AS, the function of the control unit 91 is typically performed by sequentially transmitting a signal for shifting and selecting a group of the AC signaling sources AS to be activated to the shift register or the like.

The operational circuit 8A is connected to the long sensor line LSLi where the (electrostatic) capacitance elements C1_1 to C1_m are connected. While the operational circuit 8A is connected to the short sensor line SSLi, the number the (electrostatic) capacitance elements connected to the short sensor line SSLi is a half of that of the long sensor lines LSLi.

The operational circuit 8A shown in FIG. 8 includes a differential operation unit (e.g., OP-Amp) 80, two coefficient multipliers (e.g., OP-Amp circuit) 81, a rectifier circuit 82, and an output circuit 83.

As shown in FIG. 8B, the coefficient multiplier 81 may include an OP-Amp circuit 84, resistors R1 and R2, and a capacitance C3. The coefficient multiplier 81 functions as a multiplier for multiplying the input LSL output <L> or the SSL output <S> by a predetermined coefficient such as the coefficient of FIG. 7B ((line capacitance ratio $Kc=\frac{1}{3}$ or $\frac{2}{3}$). The coefficient multiplier 81 also has a function of rejecting high-frequency noise due to the capacitance C3 in addition to the resistors.

The coefficient multiplied by the coefficient multiplier 81 with an input may be represented as $(1+r2/r1)$ (where, r1 denotes a value of the resistor R1, and r2 denotes a value of the resistor R2). As the coefficient multiplier 81 receives the LSL output <L>, the values of the resistors R1 and R2 are determined to satisfy $(1+r2/r1)=\frac{1}{3}$. As the coefficient multiplier 81 receives the SSL output <S>, the values of the resistors R1 and R2 are determined to satisfy $(1+r2/r1)=\frac{2}{3}$.

In FIG. 8B, the long sensor line LSLi is connected to the non-inverted input "+" of the IP-Amp 84, from which the detection signal Vdet (LSL output <L>) is input. The long sensor line LSLi is connected to a ground electric potential through a reset switch RSW for electrically resetting the DC level of the electric potential thereof. The resistor R2 and the capacitance C3 are connected in parallel between the output of the OP-Amp 84 and the inverted input "−", and the resistor R1 is connected between the inverted input "−" of the OP-Amp 84 and the ground electric potential.

This configuration is similarly applied to other coefficient multipliers 81 connected to the short sensor line SSLi.

The differential operation unit 80 is, for example, an OP-Amp, of which the non-inverted input "+" is connected to the output of the coefficient multiplier 81 that multiplies the coefficient by the output of the long sensor line LSLi. The inverted input "−" of the OP-Amp as the differential operation unit 80 is connected to the output of another coefficient multiplier 81 that multiplies the coefficient by the output of the short sensor line SSLi.

The differential operation unit 80 extracts the SSL output <S> after the coefficient multiplication from the LSL output <L> after the coefficient multiplication and obtains a difference therebetween (or a difference of absolute values). Therefore, a difference signal representing the difference (Delta) (=S) of FIG. 7B is output from the differential operation unit 80. Since this difference signal is an AC signal, it is converted into a DC signal by the subsequent rectifier circuit 82 and compared with a predetermined threshold value Vt in the output circuit 83. In addition, when the operation "(Delta)/(Kc−1)" of FIG. 7B is performed, a divider circuit is further provided so that the division result thereof is compared with the threshold value Vt.

However, the rectifier circuit 82 and the output circuit 83 are dispensable. Therefore, for example, when the operation "(Delta)/(Kc−1)" is not performed, the difference signal output from the differential operation unit 80 may correspond to the detection signal of the embodiment of the present invention. Alternatively, a digital signal having a different logic depending on presence/absence of the detection target object from the output circuit 83 may correspond to the detection signal of the embodiment of the present invention. In a case where the operation "(Delta)/(Kc−1)" is performed, the signal output from the divider circuit corresponds to the detection signal of the embodiment of the present invention. Anyway, the touch detection unit 8 can generate the detection signal from the sensor line output.

The rectifier circuit 82 shown in the drawing includes a diode D1 for performing the half-wave rectification, a charging capacitor C4, and a discharging resistor R0. The anode of the diode D1 is connected to the output of the coefficient multiplier 81, and the charging capacitor C4 and the discharging resistor R0 are connected between the cathode of the diode D1 and the ground potential. The charging capacitor C4 and the discharging resistor R0 constitute a smoothing circuit. The electric potential of the cathode of the diode D1 (the output of the rectifier circuit 82) is read as a digital value through the output circuit 83.

The output circuit 83 in the illustrated example includes only the comparator 85 for comparing a voltage thereof with the threshold value. The output circuit 83 also has a function of the AD converter. The AD converter may have any type such as a resistor ladder type or a capacitance dividing type. The output circuit 83 compares the input analog signal with the threshold value Vt (refer to FIG. 3A) using the comparator 85. The comparator 85 may be implemented as a function of the control circuit (not shown) such as a CPU. The comparison result is used in various applications as a signal representing whether or not touch has been performed, for example, whether or not the button manipulation has been input.

In addition, the threshold value Vt as a reference voltage of the comparator 85 may be substituted with a control unit such as a CPU, and the electric potential of the detection signal Vdet can be determined as a result.

While a configuration example of the operational circuit 8A for computing the output of two sensor lines having a different length has been described above, the configuration of the operational circuit 8A may be determined suitable for the first to third modifications described above.

According to the first embodiment, two sensor lines having different line parameters such as a length are arranged, the signal component representing the position of the detection target object and the noise component are superimposed on the output of one of the sensor lines (e.g., a long sensor line). In addition, the output of the other one (e.g., a short sensor line) has a time period where only the noise component is superimposed. The signal component has a value corresponding to the line capacitance ratio Kc of the sensor line, and noise component has a constant value regardless of the line capacitance ratio Kc. Therefore, the touch detection device according to the first embodiment can generally remove the noise component by performing an operation process using the line capacitance ratio Kc for the two sensor line outputs.

5. Second Embodiment

According to the second embodiment, the outputs of three sensor lines having different line capacitances are used in the noise rejection operation process. The second embodiment is similar to the first embodiment except for this fact. FIGS. 1A to 3C and 5A to 5C can be directly applied to the second embodiment. Configurations of FIG. 4 can be applied to the second embodiment except for a pattern shape or an arrangement of the sensor lines.

Figure 9A:
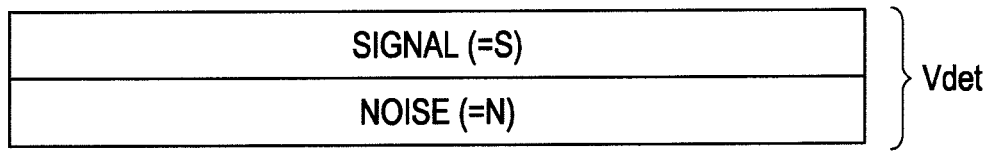
FIGS. 9A to 9C are schematic diagrams illustrating components of the sensor line outputs according to a second embodiment of the present invention.
Figure 9B:
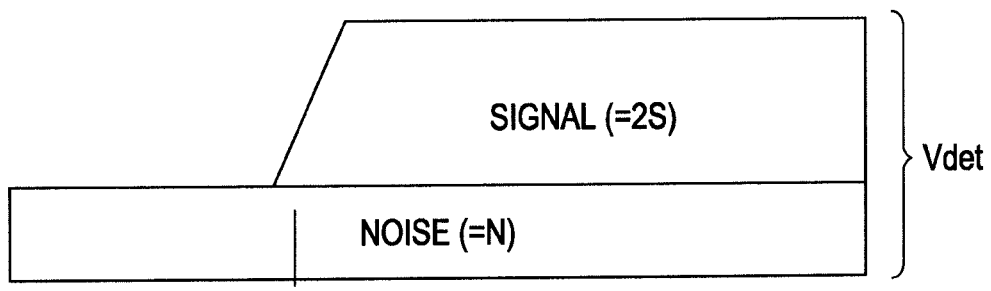
Figure 9C:
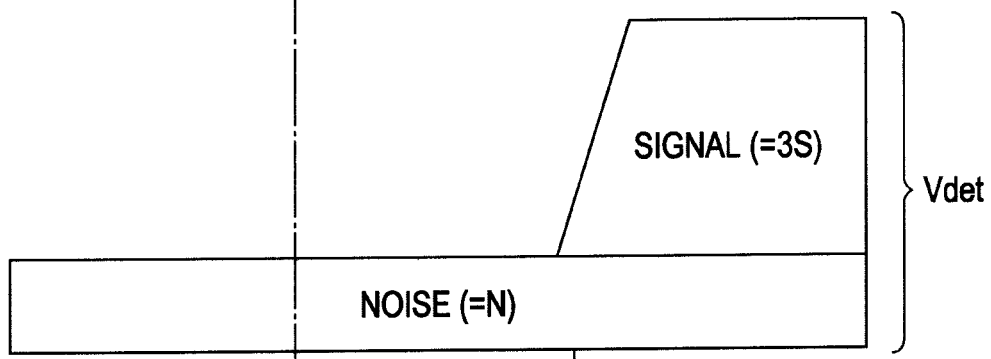
Figures 10A, 10B:
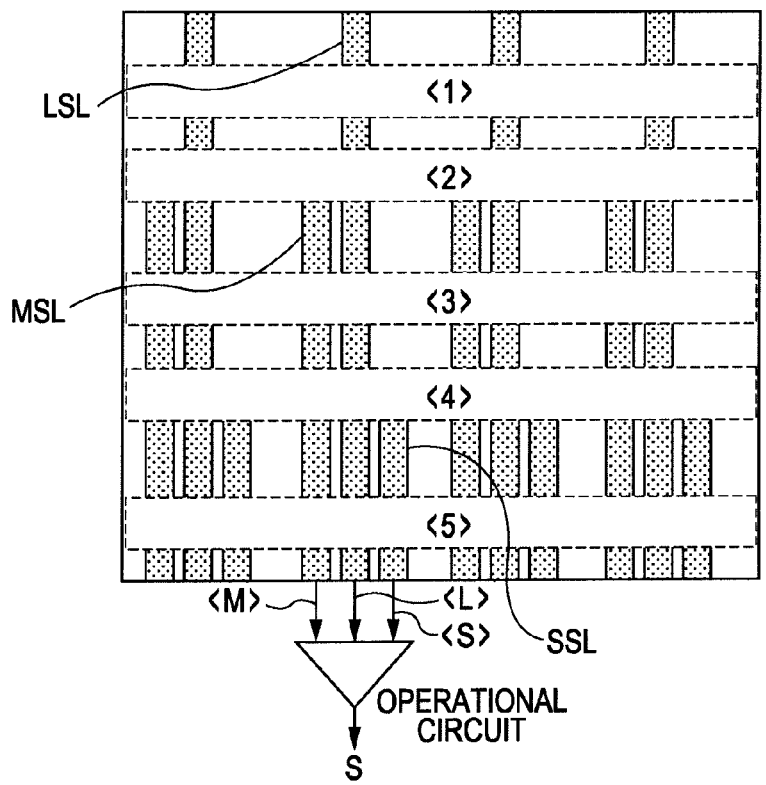
FIGS. 10A and 10B are a diagram illustrating a border position in the touch detection device according to a second embodiment of the present invention and a table showing an operation course and an operation result.

FIGS. 9A to 9C are schematic diagrams illustrating a detection signal Vdet similar to that of FIG. 6A to 6C of the first embodiment. FIGS. 10A and 10B are a top plan view illustrating a border position similar to FIGS. 7A and 7B of the first embodiment and a table showing the operation result (including an intermediate course)

According to the second embodiment, as shown in FIG. 10A, a long sensor line LSL, a middle sensor line MSL having a length corresponding to ⅔ that of the long sensor line, and a short sensor line SSL having a length corresponding to ⅓ that of the long sensor line neighbors. By setting these three sensor lines to a single group, the operational circuit performs the operation using the line capacitance ratio Kc between the sensor line outputs.

In FIGS. 9A to 9C, the noise component N is represented as a constant value "3N" regardless of the length of the sensor line, and the signal component is represented as a natural-numbered multiple (e.g., S, 2S, and 3S) of the smallest signal component S.

The noise component 3N is overlapped with the signal component S in the output of the long sensor line LSL of FIG. 9A. The noise component 2N is overlapped with the signal component 2S in the output <M> of the middle sensor line MSL (hereinafter, referred to as an MSL output) of FIG. 9B. The noise component N is overlapped with the signal component 3S in the output of the short sensor line SSL (SSL output <S>) of FIG. 9C.

The operation results (including the intermediate result) using the three sensor line outputs, i.e., the LSL output <L>, the MSL output <M>, and the SSL output <S> are shown in the table of FIG. 10B.

As shown in FIGS. 10A and 10B, in the position <1>, the operational circuit inputs "S+3N" as the LSL output <L>. In addition, the operational circuit inputs 3N as the MSL output <M> and the SSL output <S>. In the difference operation, a difference Δ(L−M) between the LSL output <L> and the MSL output <M> or a difference Δ(L−S) between the LSL output <L> and the SSL output <S> can be obtained. In this case, a difference Δ(M−S) between the MSL output <M> and the SSL output <S> becomes zero.

Similarly, the difference operation is performed for other positions <2> to <5>, and the results are summarized in the table of FIG. 10B. Here, in the positions <2> and <4>, the MSL output <M> and the SLS output <S> are outputs in the area where the effective border width varies.

From the operational results above, it is possible to obtain the signal component S that can be used in the area enveloped by a thick line in the final operation output shown in the sections Δ(L−M), Δ(L−S), and Δ(M−S) of FIG. 10B. However, since there is an area having a negative value, an absolute difference operation is used when that area is used.

The detailed operation method described above is just exemplary, and the present invention is not limited thereto. The essence of the operation method is that the noise rejection can be readily performed using the line capacitance ratio Kc because the detection signal Vdet has the signal component and the noise component in proportion to the line capacitance ratio Kc.

According to the second embodiment, three sensor lines having a different line parameter such as a length are arranged, and the noise component and the signal component representing the position of the detection target object are superimposed on the outputs of all the sensor lines. However, the outputs of the sensor line of a middle length and a shortest sensor line have a time period in which only the noise component are superimposed. The signal component has a value corresponding to the line capacitance ratio Kc of the sensor line, and the noise component has a generally constant value. Therefore, the touch detection device according to the second embodiment can generally remove the noise component by performing the operation process using the line capacitance ratio Kc for these three sensor line outputs.

Although the operation process becomes more complicated in the case of three line sensors than the two sensor lines, it is possible to calculate the signal component S by the operation even in a time range in which the border (the range of the driving electrodes activated during scanning) is overlapped in the leading end of the sensor line. Therefore, according to the second embodiment, it is advantageous in that the presence/absence or the position of the detection target object can be determined in a seamless manner in the y-direction.

In practice, since the coefficient is determined considering a parasitic capacitance between the wiring line and the TFT element, between the wiring lines, or the like, it may not be an integer multiple. However, by setting the parameter (in this case, the length of the sensor line SL) using the line capacitance ratio Kc and performing the operation using the parameter, even when the noise may not be perfectly removed, it is possible to obtain a sufficient noise suppression effect in practice. This is the same in the first embodiment of FIGS. 7A and 7B (because the coefficient is not an integer multiple in a strict sense, and even in this case, a sufficient noise suppression effect can be obtained).

6. Third Embodiment

The third embodiment relates to a display device according to the present invention. The function of the touch sensor of this display device is similar to that of the first or second embodiment.

The display device exemplified in this embodiment is a liquid crystal display device, particularly, for removing the noise superimposed by the Vcom-driving.

According to the embodiment of the present invention, the Vcom-driving is dispensable. However, in the following description, it is exemplified that a liquid crystal display device performs the Vcom-driving and simultaneously performs the display scanning (write scanning) and the sensor driving scanning by using the common electrode (opposite electrode) for the sensor driving as well as the display driving thereof. While this liquid crystal display device is advantageous in that the entire device can be thin, it is disadvantageous in that the noise source is in proximity of the sensor line within a shorter distance. Therefore, the embodiment of the present invention can be effectively applied.

In addition, the "opposite electrode" of the embodiment of the present invention refers to an electrode which takes a function of the driving electrode for detecting touch, similar to the first embodiment, as well as a function of the common electrode for the display driving of the second embodiment. Hereinafter, in order to maintain consistency with the first embodiment, the term "driving electrode DE" of the first embodiment will continuously used.

While the sensor detection accuracy is proportional to the number of sensor lines (in the present embodiment, referred to as a "sensing electrode"), the number of sensor lines becomes enormously large if the sensor lines are arranged in a matrix shape along the x-direction and the y-direction. In order to reduce the number of sensor lines, a driving method is desirable in which one of a plurality of driving electrodes is driven with an AC voltage, and such a target of the AC driving is shifted within the arrangement of a plurality of driving electrodes lined up with a constant pitch and a predetermined interval. This driving method itself is employed in the first embodiment. Therefore, it is possible to obtain the sensor output using only the sensor lines extending in the y-direction. Hereinafter, the direction of shifting the operation target of these driving electrodes is referred to as a scanning direction.

In such a technique for scanning the driving target in a scanning direction (the y-direction), if the voltage variation on the sensor line is observed along the scanning, it is possible to detect touch or proximity on the touch panel surface of the detection target object from the position of the scanning having the electric potential variation.

Application of the embodiment of the present invention is not limited to the driving method in which the driving electrodes are divided in the y-direction and driven by a predetermined number to shift the driving target. However, since the miniaturization is desirable, the following description will be made based on this driving method.

[Schematic Configuration of Display Device]

FIGS. 11A to 11C are top plan views particularly illustrating electrodes of the display device according to an embodiment of the present invention and a circuit arrangement for driving or detecting the electrodes. FIG. 11D illustrates a schematic cross-sectional structure of the display device according to an embodiment of the present invention. FIG. 11D shows a cross-section corresponding to 6 pixels, for example, in a row direction (pixel display line direction). FIGS. 13A to 13C are equivalent circuit diagrams of pixels.

The display device shown in FIG. 11A to 11D is a liquid crystal display device having a liquid crystal layer as the "display function layer."

The liquid crystal display device has, as an electrode common to a plurality of pixels out of two facing pixels with the liquid crystal layer being interposed therebetween, an electrode (driving electrode) where the common driving signal Vcom for applying a reference voltage to the signal voltage for the gray-scale display for each pixel is applied.

In FIG. 11D, in order to make it easy to see the cross-sectional structure, while the driving electrode, the pixel electrode, and the sensing electrode as main components of the embodiment of the present invention are hatched, other portions (such as a substrate, an insulation film, and a functional film) are not hatched. The omission of hatched lines will be similarly applied to other cross-sectional views subsequently described.

Figure 12:
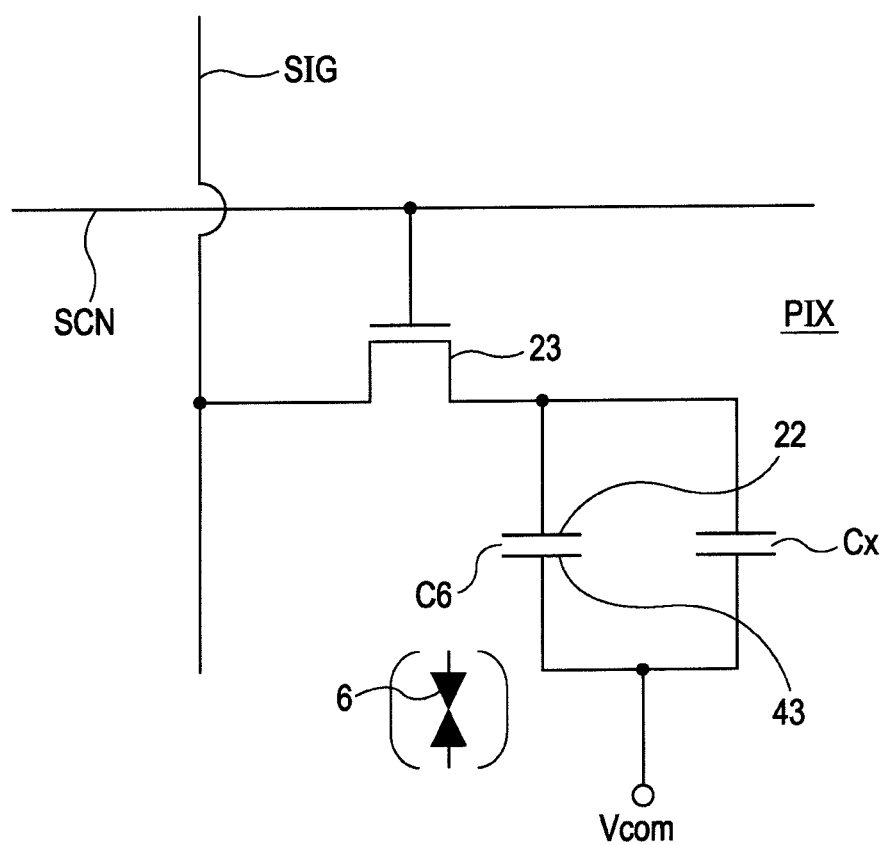
FIG. 12 is an equivalent circuit diagram of the pixel circuit of the display device according to a third embodiment of the present invention.

The pixels PIX shown of the liquid crystal display device 1 of FIG. 12 is arranged in a matrix shape. As shown in FIG. 12, each pixel PIX includes a thin film transistor TFT23 as a selection element of the pixel, an equivalent capacitance C6 of the liquid crystal layer 6, and a retentive capacitance Cx (also, referred to as an additional capacitance). The electrode arranged in one side of the equivalent capacitance C6 representing the liquid crystal layer 6 is a pixel electrode 22 divided for each pixel and arranged in a matrix shape, and the electrode arranged in the other side is a driving electrode 43 common to a plurality of pixels.

The pixel electrode 22 is connected to one of the source and the drain of the thin film transistor TFT23, and the image signal line SIG is connected to the other one of the source and the drain of the thin film transistor TFT23. The image signal line SIG is connected to a vertical driving circuit (not shown, refer to FIGS. 13A to C of the embodiments described below) so that the image signal having a signal voltage is supplied from the vertical driving circuit to the image signal line SIG.

The driving electrode 43 is provided with the common driving signal Vcom. The common driving signal Vcom is obtained by inverting between positive and negative electric potentials for each horizontal cycle (1H) with respect to the center voltage.

The gate of the thin film transistor TFT23 is electrically shared among all pixels PIX lined up in a row direction, i.e., in a horizontal direction of the display screen so that the scanning line SCN is formed as a result. The scanning line SCN is supplied with a gate pulse output from the vertical driving circuit (not shown) for turning on/off the gate of the thin film transistor TFT23. Therefore, the scanning line SCN is also referred to as a gate line.

As shown in FIG. 12, the retentive capacitance Cx is connected to the equivalent capacitance C6 in parallel. The retentive capacitance Cx is provided to prevent a write electric potential from decreasing by the leak current from the thin film transistor TFT23 due to shortage of the storage capacity in the equivalent capacitance C6. In addition, addition of the retentive capacitance Cx contributes to preventing flickers or improving uniformity of the screen luminance as well.

From the viewpoint of the cross-sectional structure (FIG. 11D), the liquid crystal display device 1 having such pixels includes a panel (hereinafter, referred to as a driving panel 2) which has a thin film transistor TFT23 shown in FIG. 12 in the area not shown in the cross section and is supplied with a driving signal (signal voltage) of the pixel, an opposite panel 4 arranged to face the driving panel 2, and a liquid crystal layer 6 arranged between the driving panel 2 and the opposite panel 4.

The driving panel 2 has a TFT panel 21 (of which a panel body unit is made of glass) as a glass substrate having the thin film transistor TFT23 of FIG. 12 and a plurality of pixel electrodes 22 arranged on this TFT panel 21 in a matrix shape.

A display driver (not shown) for driving each pixel electrode 22 (including the vertical driving circuit, the horizontal driving circuit) is formed on the TFT panel 21. The thin film transistor TFT 23 of FIG. 12 and wiring lines such as the image signal line SIG and the scanning line SCN are formed on the TFT panel 21. The touch detection unit 8 (refer to FIGS. 4A, 4B, 8A, and 8B) of the first embodiment may be formed on the TFT panel 21.

The opposite panel 4 includes a glass substrate 41, a color filter 42 formed on one surface of the glass substrate 41, and a driving electrode 43 formed on the color filter 42 (the liquid crystal layer 6 side). The color filter 42 is configured by periodically arranging three color filter layers having, for example red, green, and blue colors (R, G, and B), and each pixel PIX (pixel electrode 22) corresponds to one of the three colors R, G, and B. While in some cases, a pixel corresponding to one color is called a subpixel, and three subpixels having three colors R, G, and B are called a pixel, the subpixel is also called a pixel PIX herein.

The driving electrode 43 is also used as the driving electrode DE (refer to the first and second embodiments) of the touch detection sensor included in a part of the touch sensor for performing the touch detection operation. The opposite electrode 43 corresponds to the driving electrode E1 of FIGS. 1A to 2B.

The driving electrode 43 is connected to the TFT panel 21 by the contact conductive pillar 7. The common driving signal Vcom having an AC pulse waveform is applied from the TFT panel 21 to the driving electrode 43 through the contact conductive pillar 7. The common driving signal Vcom corresponds to the AC pulse signal Sg supplied from the driving signal source S of FIGS. 1A to 2B.

The other surface (display surface side) of the glass substrate 41 is provided with the sensor line SL, and the protection layer 45 is formed on the sensor line SL. The sensor line SL constitutes a part of the touch sensor and corresponds to the detection electrode E2 in FIGS. 1A to 2B. The glass substrate 41 may have a touch detection unit 8 for performing the touch detection operation described below (refer to FIGS. 8A and 8B).

The liquid crystal layer 6 as a display function layer modulates the light passing through the thickness direction (a direction facing the electrode) according to the state of the applied electric field. The liquid crystal layer 6 may be formed using various modes of liquid crystal materials such as TN (twisted nematic), VA (vertical alignment), and ECB (electrically controlled birefringence).

The alignment film is provided between the liquid crystal layer 6 and the driving panel 2 and between the liquid crystal layer 6 and the opposite panel 4. A polarization plate is provided in the anti-display surface side (i.e., back surface side) of the driving panel 2 and the display surface side of the opposite panel 4. Such an optical function layer is omitted from FIGS. 11A to 11D.

[Configuration of Driving Electrode and Driving Scanning]

As shown in FIG. 11A, the driving electrode 43 is divided in a row or column direction of the pixel arrangement, e.g., in a column direction in this example (the vertical direction of the drawing). This division direction corresponds to a scanning direction of the pixel lines in the display driving, i.e., a direction for sequentially activating the scanning lines SCN by the vertical driving circuit (not shown).

The driving electrode 43 is divided into a total of (k×m) driving electrodes. Therefore, driving electrodes 43_1, 43_2, ... , 43_k, ... , 43_km are arranged in a planar band-shaped pattern extending in a row direction and spaced from one another in parallel on the corresponding surface.

A division arrangement pitch of the (k×m) driving electrodes 43_1 to 43_km is set to a natural-numbered multiple of the (sub)pixel pitch or the arrangement pitch of the pixel electrodes.

In addition, in FIGS. 11A to 11D, the driving electrodes DE are a set of k driving electrodes 43 (k>2) and driven by an AC voltage in this unit. The unit of the AC driving is set to be larger than one pixel line because the detection sensitivity can be improved by increasing the electrostatic capacitance of the touch sensor. Meanwhile, it is possible to accommodate invisualization of shifting by shifting the driving electrodes DE by a natural-numbered multiple of pixel pitch unit.

Meanwhile, during the Vcom-driving in the unit of the driving electrodes DE in this manner, the shifting is performed by the scan driving unit 9 as an AC driving scanning unit provided within the vertical driving circuit (the write driving scanning unit) (not shown). The operation of the scan driving unit 9 can be considered to be the same as "the operation of scanning in a column direction while switching one by one the driving electrodes selected by moving, in a column direction, the AC signaling source AS which simultaneously drives the wiring lines of the k driving electrodes with an AC voltage Vcom (refer to FIGS. 1A and 1B, 2A and 2B, and 8A and 8B)."

Meanwhile, similar to the first embodiment, the sensor lines SL are obtained by alternately arranging the n long sensor lines LSLi and n short sensor lines SSLi. A total of 2n sensor lines SL are formed of parallel stripe wiring lines extending in the y-direction. Out of the 2n sensor lines, the LSL output <L> is output from the long sensor line LSLi, and the SSL output <S> is output from the short sensor line SSLi.

These 2n sensor line outputs are input to the touch detection unit 8, for example, using an exemplary operational circuit 8A shown in FIG. 8B as basic detection unit.

In addition, FIGS. 11A and 11B are diagrams separated to describe the electrode pattern. However, in practice, as shown in FIG. 11C, the driving electrodes 43_1 to 43_km and the sensor lines (the long sensor line LSLi and the short sensor line SSLi) are overlappingly arranged to detect the position within a 2-dimensional plane. In this configuration, the touch detection unit 8 can detect the position of the row direction based on which operational circuit 8A generates the voltage variation and obtain the position information in a column direction based on the detection timing. In other words, the Vcom-driving of the scan driving unit 9 and the operation of the touch detection unit 8 are synchronized with, for example, a clock signal having a predetermined period. Through such a synchronization operation, the touch detection unit 8 can detect a finger touch position center because it is possible to know which divided driving electrode is driven by the scan driving unit 9 when the touch detection unit 8 obtains the voltage variation. Such a detection operation is controlled by a computer-based total control circuit (not shown) which totally controls the liquid crystal display device 1, for example, a CPU, a microcomputer, or a control circuit for detecting touch.

While the scan driving unit 9 as the "AC driving scanning unit" is formed on only the driving panel 2 side of FIG. 11D, the touch detection unit 8 may be formed in the driving panel 2 side as well as the opposite panel 4 side. Since the TFTs are integrated with a high density, it is desirable that the touch detection unit 8 is also provided in the driving panel 2 in order to reduce the manufacturing process number. However, since the sensor line SL exists in the opposite panel 4 side, and the sensor line SL is formed of a transparent electrode material, the wire resistance may increase. In that case, in order to avoid difficulties such as a high resistance of the wiring lines, it is preferable that the touch detection unit 8 is formed in the opposite panel 4 side. However, if the process of forming the TFT is used in the opposite panel 4 only for the touch detection unit 8, it disadvantageously demands high cost. The position for forming the touch detection unit 8 may be determined by comprehensively considering the aforementioned advantages and disadvantages.

Figure 13:
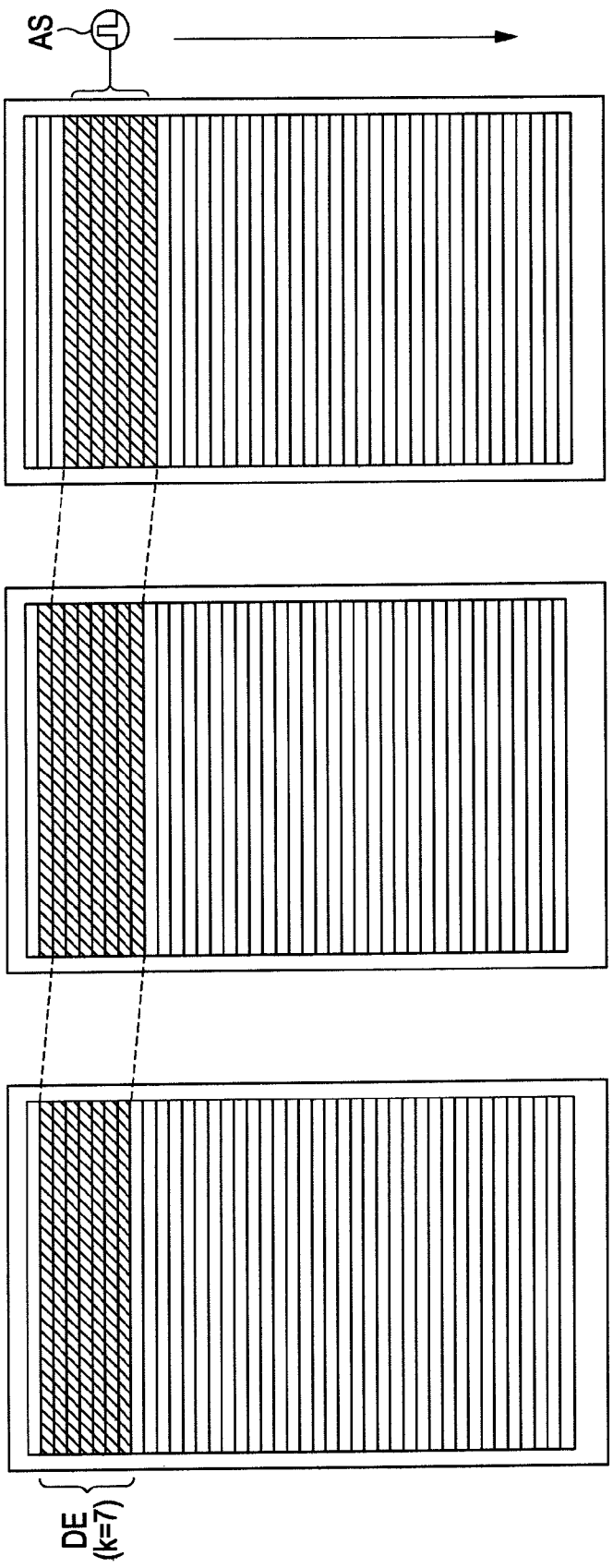
FIGS. 13A to 13B illustrate a border scanning performed by the display device according to a third embodiment of the present invention.

FIG. 13 illustrates such an AC driving operation and the shift operation.

In FIGS. 13A to 13C, a single driving electrode DE is constructed of 7 hatched driving electrodes 43. Here, the driving electrode 43 is different from the driving electrode DE in that k driving electrodes 43 simultaneously driven are called driving electrodes DE.

FIGS. 13A to 13C illustrate a progress of the selection range when the driving electrodes DE are shifted in the unit of a single pixel line, i.e., by a pitch of a single driving electrode 43 in a column direction.

In the time T1 of FIG. 13A, an initial single pixel line is not selected, but k driving electrodes corresponding to second to eight pixel lines are selected and simultaneously driven by the AC signaling source AS with an AC voltage.

In the next cycle (time T2), the driving electrodes DE are shifted by a single pixel line so that two driving electrodes corresponding to the first and second pixel line are not selected, 7 driving electrodes subsequent to the third driving electrode are selected, and others are not selected.

Furthermore, in the next cycle (time T3), the driving electrodes DE are shifted by a single pixel line so that driving electrodes corresponding to the first to third lines are not selected, 7 driving electrodes subsequent to the fourth driving electrode are selected, and others are not selected. Then, the shifting and the AC driving operations are similarly repeated.

Through such operations, the value of m in the equation of FIG. 5C is reduced by $1/7$ of the practical dividing number so that the effective value of the sensor voltage Vs increases accordingly. Meanwhile, as shown in FIGS. 13A to 13C, the unit that is newly included in and excluded from the selection group (the driving electrode DE) is a single driving electrode corresponding to a single pixel line. Therefore, the switching frequency of the AC driving becomes equal to the inversion frequency 1H of the common driving signal Vcom. This frequency is an extremely high frequency obtained by multiplying a commercial electric power frequency, e.g., 60 [Hz] by the number of pixels in the column direction. For example, the number of pixels in the column direction is set to 480, this frequency becomes 28.8 [kHz], and the frequency of the pulse waveform becomes 14.4 [kHz] which is a half thereof. Therefore, an image variation caused by the shifting of the AC driving has a sufficient high frequency unrecognizable by a human eye. Consequently, it is possible to prevent both the S/N ratio reduction caused by the sensor voltage falling and the image quality degradation caused by the switching of the electrode driving.

[Arrangement of Pixel Electrode and Image Signal Line]

Figure 14:
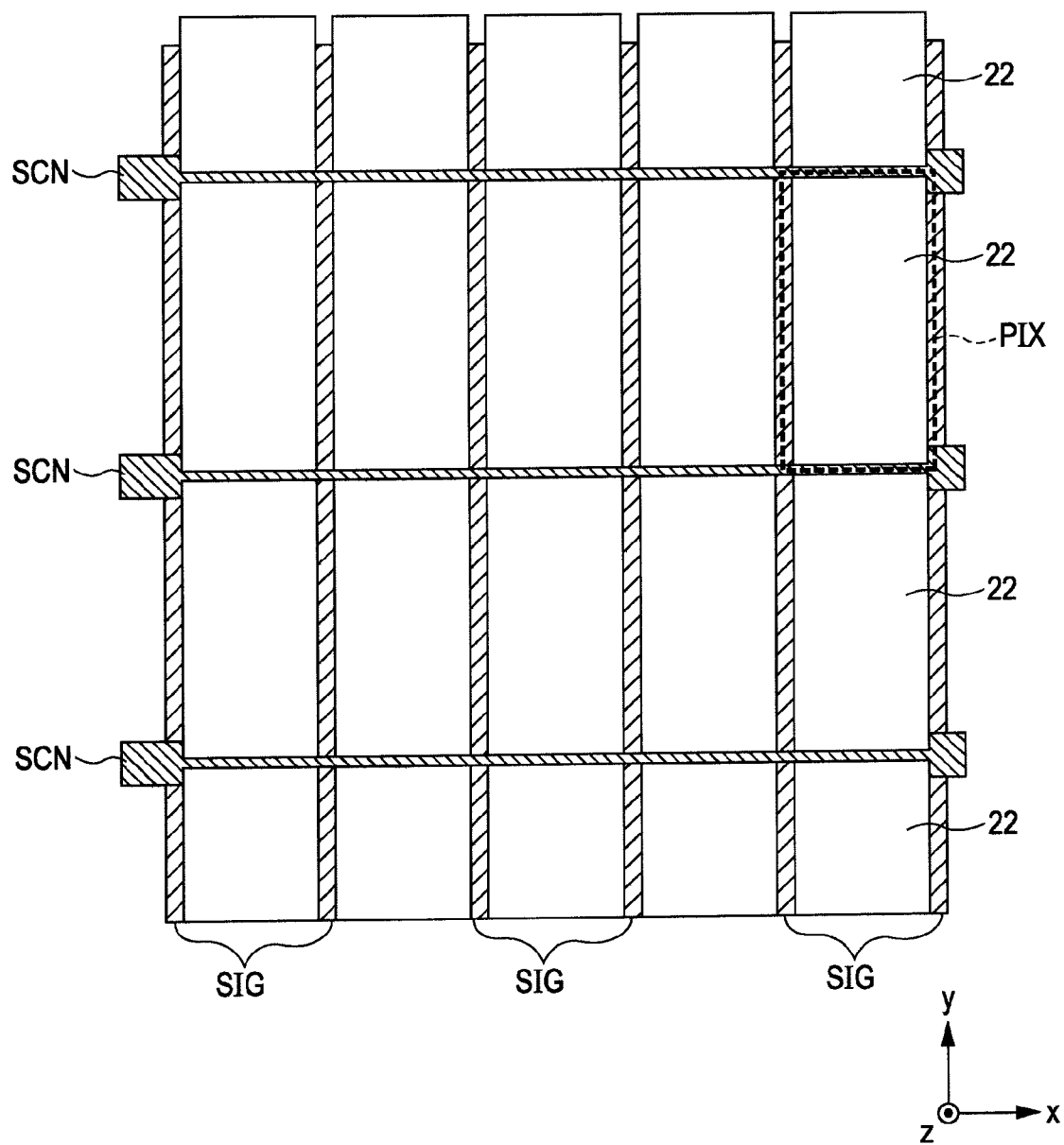
FIG. 14 is an enlarged plan view illustrating a liquid crystal display unit after forming the pixel electrode in the display device according to a third embodiment of the present invention.

FIG. 14 is an enlarged plan view illustrating a display unit in the middle of a manufacturing process of forming the pixel electrode 22.

In the plan view of FIG. 14 in the middle of a process of forming the pixel electrode 22, a plurality of gate lines (scanning lines SCN, refer to FIG. 12) arranged in a parallel stripe shape in a row direction (x-direction) intersect with a plurality of image signal lines SIG arranged in a parallel stripe shape in a column direction (y-direction. The rectangular area surrounded by two arbitrary scanning lines SCN and two arbitrary image signal lines SIG defines the (sub)pixel PIX. The pixel electrode 22 is formed in the rectangular isolation pattern slightly smaller than each pixel PIX. As such, a plurality of pixel electrodes 22 are arranged in a matrix shape in a planar shape.

[Display Operation]

Next, operations of the display device having the aforementioned configuration will be described.

The display driver of the driving panel 2 (the horizontal driving circuit and the vertical driving circuit that are not shown) sequentially supplies line by line each electrode pattern of the driving electrodes 43 (driving electrodes 43_1 to 43_km) with the common driving signal Vcom. In this case, the method of selecting the driving electrode and the shifting method are similar to those described above. The common driving signal Vcom is also used to control the electric potential of the driving electrode of the image display. In addition, the display driver supplies the pixel electrode 22 with a signal voltage through the image signal line SIG and also sequentially controls line by line the switching of the TFT of each pixel electrode through the scanning line SCN in synchronization therewith. As a result, in the liquid crystal layer 6, an electric field in a vertical direction (perpendicular to the panel) determined by the common driving signal Vcom and each pixel signal is applied to each pixel to modulate the liquid crystal state. As a result, a display operation by a so-called inverted driving is performed.

Meanwhile, in the opposite panel 4 side, the capacitance element C1 is formed in each of the intersections between the driving electrodes 43_1 to 43_km and the long sensor line LSLi or the short sensor line SSLi. The common driving signal Vcom is sequentially applied to each electrode pattern of the driving electrode 43 in a time division manner. Then, each of the capacitance elements C1 corresponding to a single column formed in intersections between the electrode patterns of the driving electrode 43 where the common driving signal Vcom is applied and the electrode patterns of the sensor lines (LSLi and SSLi), is charged/discharged. As a result, the output from the sensor line (LSLi and SSLi) has a magnitude corresponding to the capacity of the capacitance element C1. In a state that a user's finger touches the surface of the opposite panel 4, the magnitude of this sensor line output becomes nearly constant (to a sensor voltage Vs). In addition to the scanning of the common driving signal Vcom, the columns of the capacitance elements C1 corresponding to the target of the charge/discharge operations are sequentially shifted line by line.

Here, if a user's finger touches any place on the surface of the opposite panel 4, the capacitance element C2 caused by the finger is added to the capacitance element C1 that has been originally formed in the touched portion. As a result, a value (sensor voltage Vs) of the sensor output when that touched portion is scanned becomes smaller than those of other portions (becomes the sensor voltage Vf(<Vs)). The touch detection unit 8 (refer to FIGS. 8A and 8B and 11A to 11D) performs the operation process shown in FIG. 7B using each operational circuit 8A to generate the detection signal Vdet. In addition, the detection signal Vdet is compared with the threshold value Vt. If the detection signal Vdet is equal to or smaller than the threshold value Vt, that portion is determined as the touched portion. This touched portion can be obtained from the timing when the common driving signal Vcom is applied and the timing when the detection signal Vdet equal to or smaller than the threshold value Vt is detected.

As such, according to the third embodiment of the present invention, the common electrode (driving electrode 43) originally provided in the liquid crystal display device for driving the liquid crystal is also used as one of a touch sensor electrode pair including the driving electrode and the sensing electrode. The electrostatic capacitance element type touch sensor is constructed such that the common driving signal Vcom as the display driving signal is also used as the touch sensor driving signal. Therefore, an electrode to be newly provided to add the touch sensor function is just the sensor line, and a unit for generating the touch sensor driving signal is not necessary to newly provided. Therefore, the configuration is simple.

In addition, a plurality of k driving electrodes 43 are simultaneously driven with an AC voltage, and by using these driving electrodes as a single driving electrode DE, the driving electrode DE is shifted such that all of the driving electrodes 43 are selected by performing the AC driving twice. For this reason, it is possible to prevent both reduction of the S/N ratio of the sensor detection voltage and image quality degradation. Furthermore, since the driving electrode and the driving circuit for the common driving signal Vcom can also be used as the driving electrode and the driving circuit for the sensor, it is possible to accordingly reduce arrangement space and power consumption.

In addition, in FIGS. 4A, 4B and 14, while the sensor line SL is shown as a line having a predetermined width and two types of lengths, the modifications of the first and second embodiments can also be applied to the third embodiment.

Hereinafter, some modifications of the third embodiment will be described.

7. Fourth Modification

The structure and the driving method of the display device described above in conjunction with the third embodiment is advantageous in that the thickness of the (liquid crystal) display device obtained by integrating the touch panel can be thinned.

However, even in the case where the touch panel is integrated into the display panel, the driving electrode of the touch sensor may be provided in a different layer from the driving (common) electrode for the (liquid crystal) display. In this case, the driving electrodes of the touch sensor may be arranged as a single electrode facing a plurality of pixel electrodes without separation. However, the sensor lines are arranged in a matrix shape where the first sensor line group extending in the y-direction and the second sensor line group extending in the x-direction intersect with each other. A single electrode used only for the driving electrode of the touch sensor is arranged to be capacitively coupled to both the first sensor line group and the second sensor line group with a predetermined strength. The embodiment of the present invention is applied to both the first and second sensor line groups. In other words, the second sensor line group of the x-direction as well as the first sensor line group of the aforementioned y-direction is made to have a plurality of line capacitances by changing, for example, a type such as a length. In the second sensor line group of the x-direction as well as the first sensor line group, a process of removing noise by the operation using the line capacitance ratio is performed for a plurality of sensor line outputs having a different line capacitance. As a result, in the display device having the touch detection function and the sensor lines arranged in a matrix shape, it is possible to effectively remove noise and improve sensor detection accuracy.

In addition, the matrix arrangement of the sensor lines may be applicable to the touch detection device described in conjunction with the first and second embodiments.

8. Fifth to Seventh Modifications

The liquid crystal layer 6 is used to modulate the light passing therethrough in response to the electric field state, and, for example, liquid crystals of a horizontal electric field mode such as a FFS (Fringe-field switching) mode or an IPS (in-plane switching) mode are preferably used.

Figure 15:
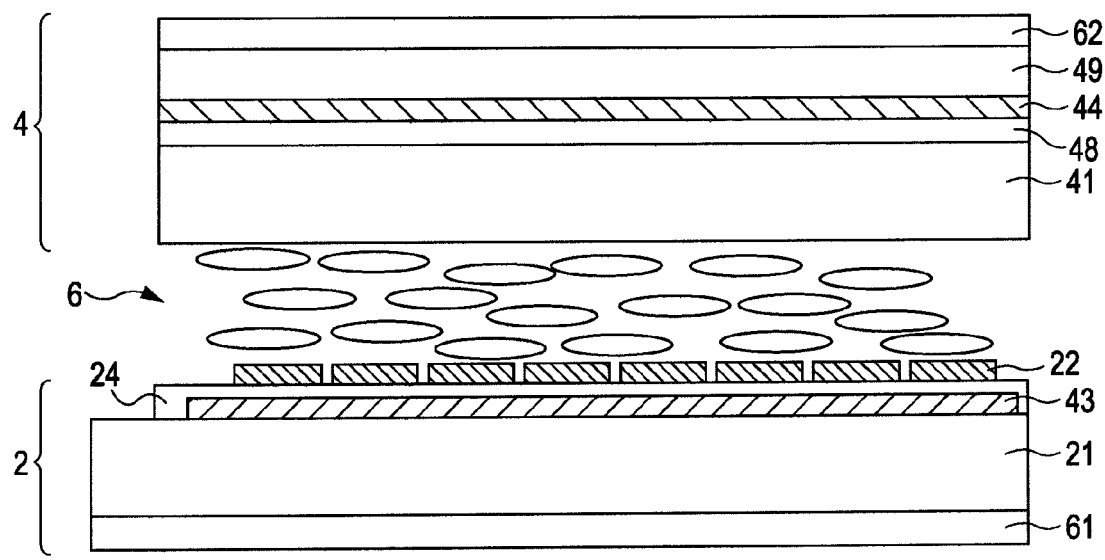
FIG. 15 is a schematic cross-sectional view illustrating a configuration example according to a fifth modification.
Figure 16:
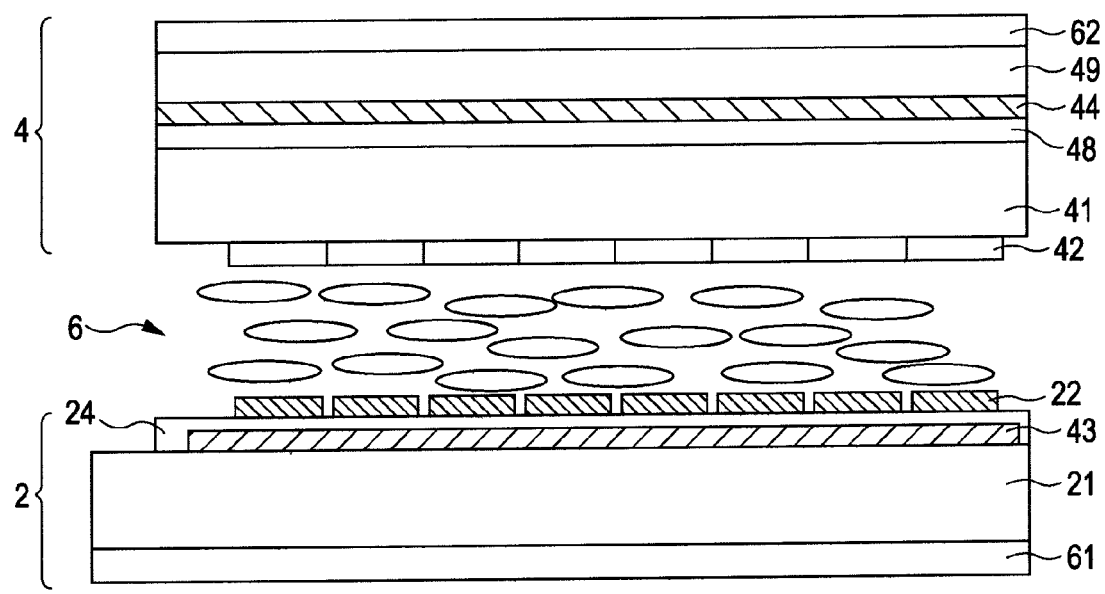
FIG. 16 is a schematic cross-sectional view illustrating a configuration example according to a sixth modification.
Figure 17:
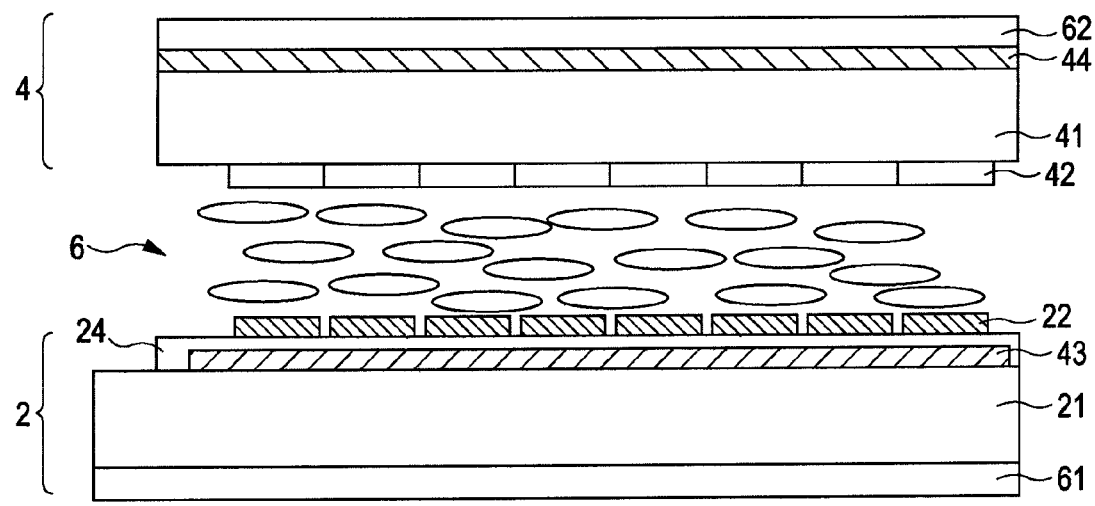
FIG. 17 is a schematic cross-sectional view illustrating a configuration example according to a seventh modification.

FIGS. 15 to 17 illustrate a constructional example of a horizontal electric field mode liquid crystal display device.

In the structure shown in FIG. 11B, the pixel electrode 22 and the driving electrode 43 face to each other with the liquid crystal layer 6 being interposed therebetween. An electric field in a vertical direction is applied to the liquid crystal layer 6 in response to the voltage applied between both the electrodes.

In the horizontal electric field mode, the pixel electrode 22 and the driving electrode 43 are arranged in the driving panel 2 side.

In the structure of the fifth modification shown in FIG. 15, the driving electrode 43 is disposed in the surface of the front side of the TFT panel 21 (the display surface side), and the driving electrode 43 and the pixel electrode 22 neighbor to each other by interposing the insulation layer 24. The driving electrode 43 is arranged in a line shape extending in a display line direction (x-direction), and the pixel electrode 22 is separated for each pixel in that direction.

The TFT panel 21 is bonded to the glass substrate 41 such that the pixel electrode 22 side is adjacent to the liquid crystal layer 6. The liquid crystal layer 6 is structurally maintained by a spacer (not shown).

The reference numeral "49" denotes a base material disposed in the display surface side such as glass or a transparent film. One surface of the base material 49 is provided with the sensor line SL. The sensor line SL maintained in the base material 49 is fixed to the surface of the anti-liquid crystal side of the glass substrate 41 by the bonding layer 48.

Meanwhile, a first polarization plate 61 is attached to the back surface of the TFT panel 21, and a second polarization plate 62 having a different polarization direction is attached to the display surface side of the base material 49.

A protection layer (not shown) is formed in the display surface side of the second polarization plate 62.

In the structure of the sixth modification shown in FIG. 16, the color filter 42 is previously formed in the liquid crystal side of the glass substrate 41. The color filter 42 has a different color area regularly arranged for each (sub)pixel.

In the structure of the seventh modification shown in FIG. 17, the stack structure of the display surface side is different from that of FIG. 16.

In the structure of FIG. 16, the sensor line SL is previously formed on the base material 49 and attached, for example, as a roll shape member. However, in FIG. 17, the sensor line SL is formed on the display surface side of the glass surface 41, and the second polarization plate 62 is attached thereon.

Next, modifications (eighth to eleventh modifications) common to the aforementioned first to third embodiments and first to seventh modifications will be described.

9. Eighth Modification

Figure 18:
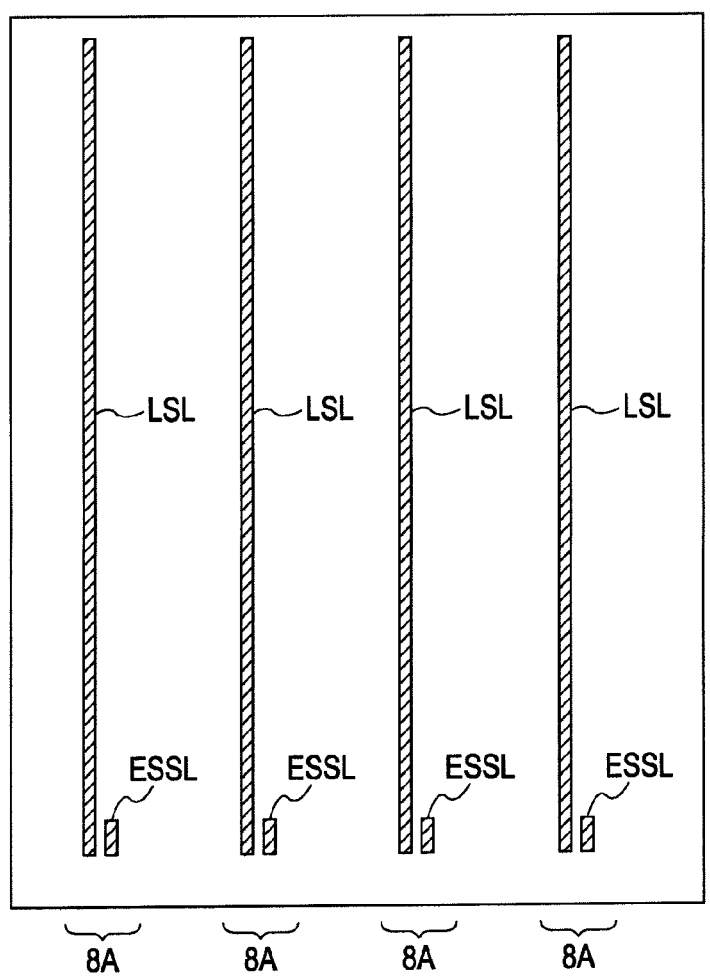
FIG. 18 is a top plan view illustrating a sensor line arrangement according to an eighth modification.

The length of the short sensor line SSLi of the eighth modification shown in FIG. 18 is extremely short. This is intended to dedicatedly use the extremely short sensor line SSLi for detecting the noise component N that is not overlapped with the signal component S by arranging the short sensor line SSLi in an outer side from the detection surface.

This modification is particularly effective in the second embodiment in which sensor lines having three lengths are provided.

In the table of FIG. 10B, it is assumed that this extremely short sensor line ESSL exists, for example, only in the position <5>. Then, a value of the SSL output <S> corresponding to the extremely short sensor line output, i.e., "3S+3N" is represented as just "3N". Meanwhile, the LSL output <L> becomes "S+3N." Therefore, it is possible to calculate the signal component S just by subtracting the extremely short sensor line output from the LSL output <L> so that the used portions increase.

10. Ninth Modification

Figure 19:
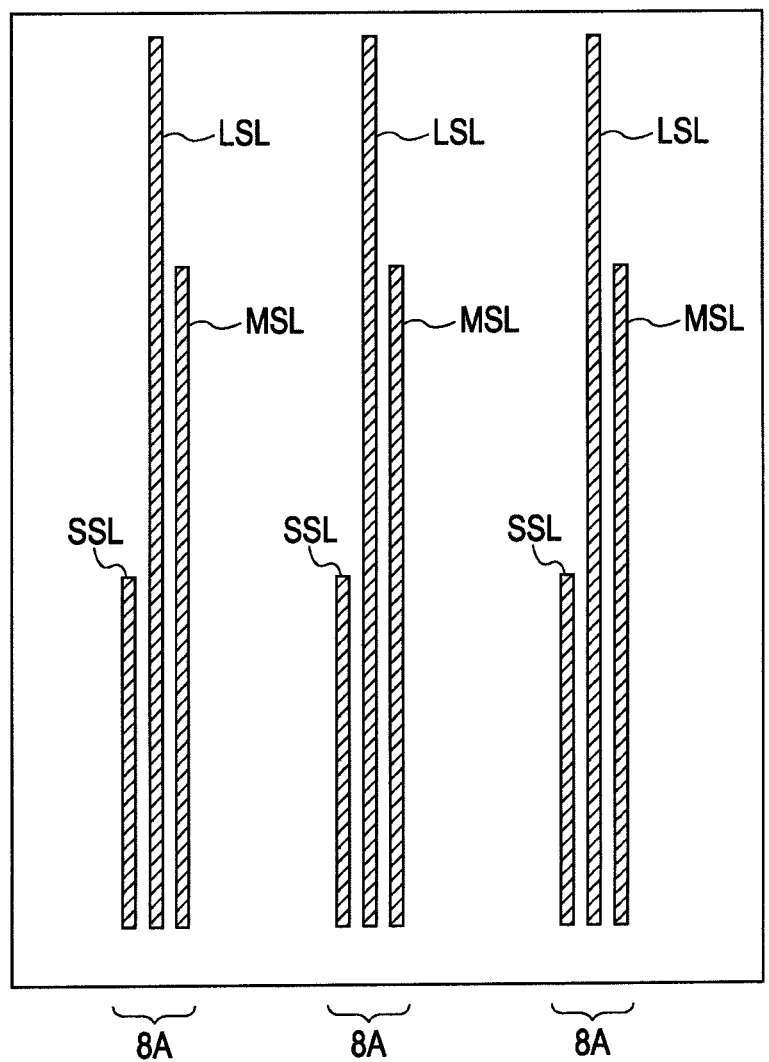
FIG. 19 is a top plan view illustrating a sensor line arrangement according to a ninth modification.

In the ninth modification shown in FIG. 19, the arrangement order of the sensor lines that were arranged in the order of MSL, LSL, and SSL in FIG. 10A is arbitrarily set. For example, in FIG. 19, three sensor lines are arranged in the order of SSL, LSL, and MSL. As such, the arrangement order of the sensor lines is arbitrarily set.

The sensor lines may not be arranged regularly as in FIGS. 18 and 19, but the sensor lines having different lengths within a pair of two or a group of three may be arranged apart if they correspond to the operational circuit 8A side. However, since the configuration of the operational circuit 8A can be perfectly the same, the sensor lines are preferably arranged on a regular basis. Here, the "different types of M sensor lines are periodically repeatedly arranged" in the regular arrangement.

11. Tenth Modification

In the tenth modification, a single operational circuit 8A and another neighboring operational circuit 8A share a single sensor line.

Figure 20:
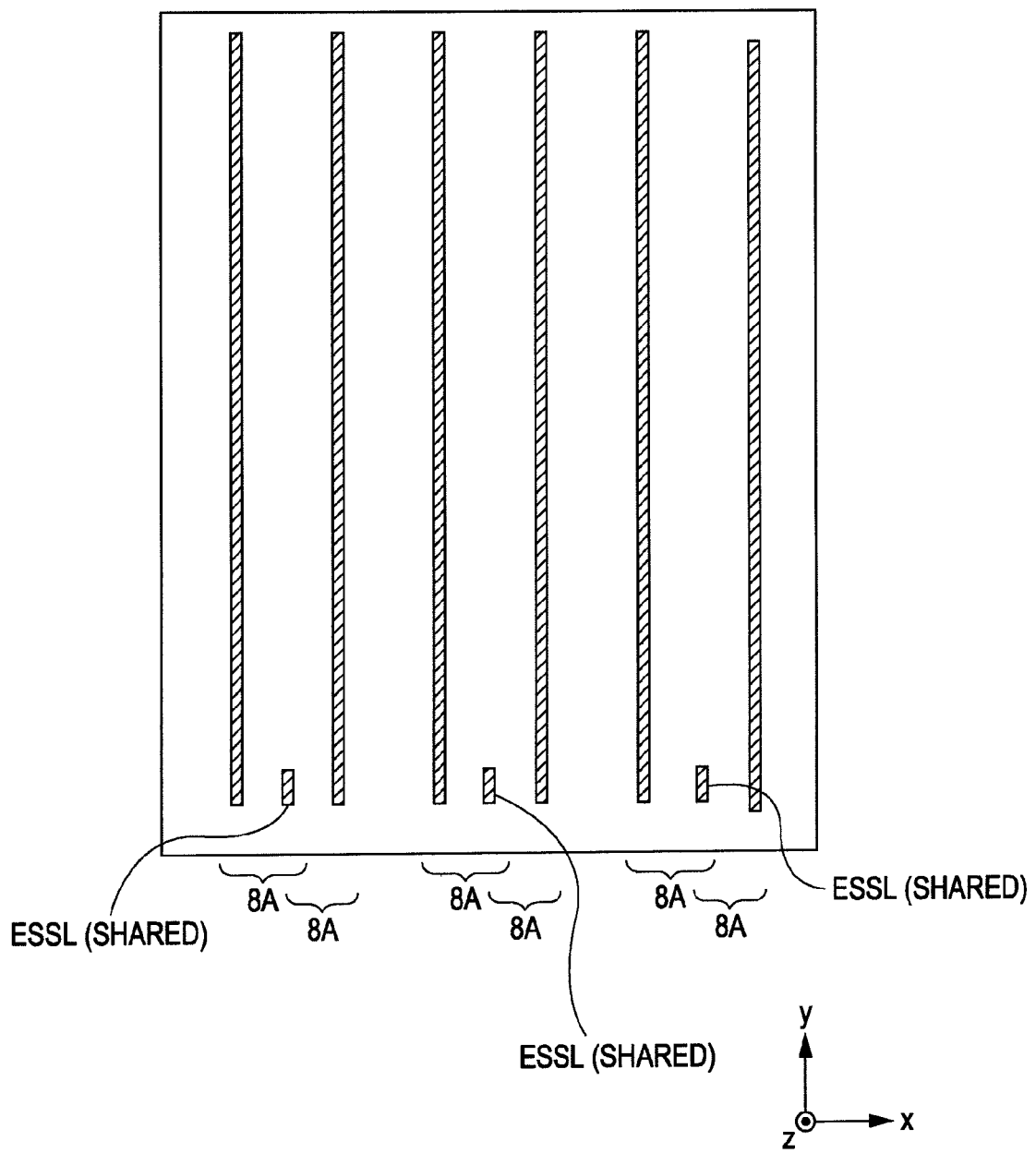
FIG. 20 is a top plan view illustrating a sensor line arrangement according to a tenth modification.

For example, in FIG. 20, a single extremely short sensor line ESSL is shared by two input operational circuits 8A. In addition, in FIG. 21, the MSL and the SSL are alternately shared by neighboring operational circuits 8A. In addition, if many types of the lengths are used, two sensor lines may be shared. Further, a selector (not shown) for switching the shared sensor line for a plurality of operational circuit may be provided.

Such a sharing structure includes a structure in which "two operational circuits 8A are connected to the same sensor line, and different types of sensor lines are symmetrically arranged with respect to the common sensor line in the two operational circuits."

12. Eleventh Modification

Figure 22:
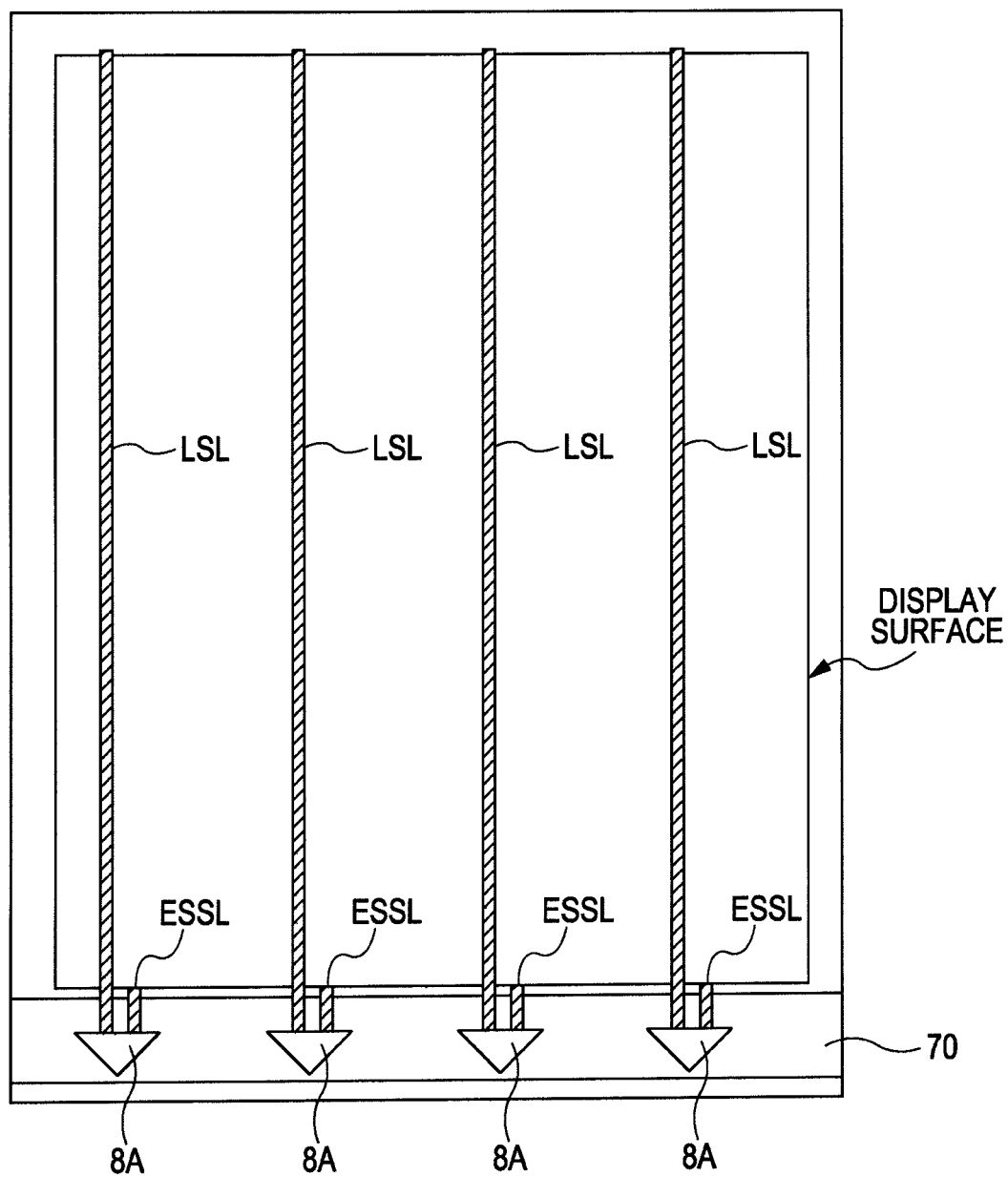
FIG. 22 is a top plan view illustrating a sensor line arrangement according to an eleventh modification.

The extremely short sensor line ESSL may be arranged in an outer side from the detection surface or the effective area of the display surface, and the surface making contact with the detection target object may be covered with a shield layer 70 as shown in FIG. 22. Such a configuration is to consider a case where the incoming electromagnetic noise degrades the noise rejection accuracy such as a case where a relationship between the incoming electromagnetic noise and the line capacitance ratio Kc is little. As a result, the effect of the incoming electromagnetic noise is not removed by the operation circuit 8A. However, if the operational circuit 8A extracts the incoming electromagnetic noise which varies from time to time from the sensor line output, an error increases sometimes. If the shield layer 70 is provided, the incoming electromagnetic noise component is not included in the noise component N. Therefore, it is possible to suppress unevenness of the detection error.

In addition, as shown in FIG. 22, it is possible to improve the computation accuracy by shielding the operational circuit 8A.

13. Noise Source of Display Device and Noise Suppression Effect

Next, similar to the third embodiment, a noise source having a significant effect when the touch sensor function is mounted on the display device will be described.

While various noise sources of the touch sensor have been already described in conjunction with the first embodiment, the wiring line having a strong capacitive coupling to the sensor line is the wiring line having a large electric potential variation and arranged in parallel with the sensor line. Particularly, as the display devices are made thinner, they tend to have a reduced interval between this wiring line and the sensor line. Such a wiring line may include an image signal line SIG. As shown in FIG. 14, the image signal line SIG is arranged in the y-direction, the same direction as that of the sensor line, and provides an AC signal, of which a reference electric potential of the image signal fluctuates, having an opposite phase to the electric potential Vcom with a period of 1H (1 horizontal display cycle) corresponding to the voltage Vcom of the driving electrode 43.

Figure 23A:
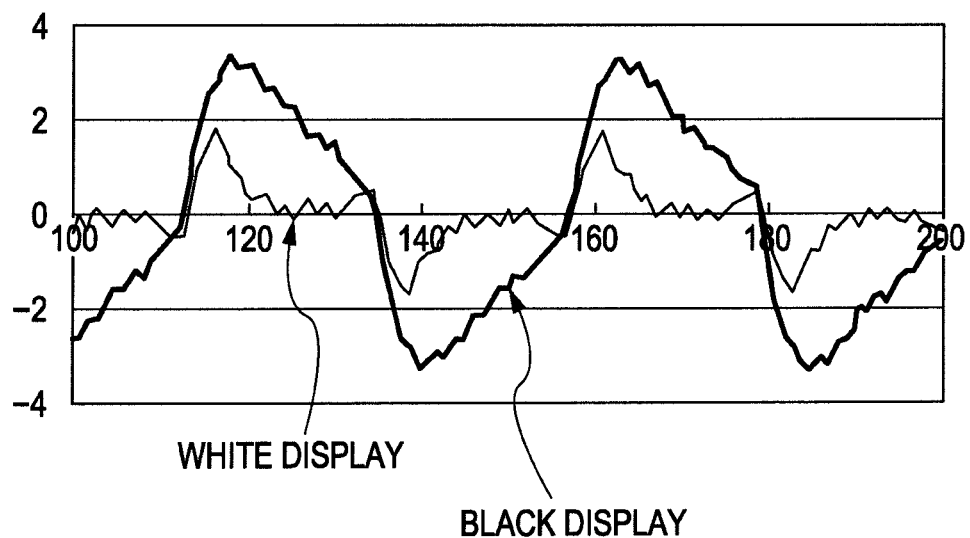
FIGS. 23A and 23B are waveform diagrams illustrating a noise source.
Figure 23B:
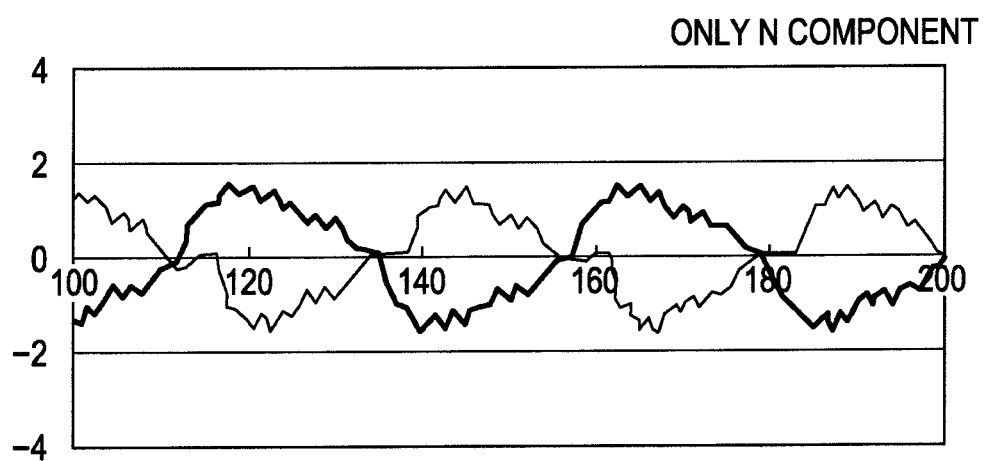

FIG. 23A illustrates an electric potential waveform of the long sensor line LSLi in a case where the entire display is set to a white display and in a case where the entire display is set to a black display for comparison. FIG. 23B illustrates an electric potential waveform of the short sensor line SSLi where only the noise component N is depicted for comparison between the white display and the black display.

As shown in FIG. 23A, the sensor line output significantly changes in response to the display of the display device. This is because the noise component N shown in FIG. 23B periodically changes with an opposite phase in every cycle 1H. The following two reasons are contemplated as a reason of generating the noise component N.

As a first reason, the phase of the electric potential fluctuation of the driving electrode DE driven by the voltage Vcom is inverted in every cycle 1H. As a second reason, the reference level of the image signal at the image signal line SIG is also inverted in every cycle 1H in association with the Vcom-driving.

However, since the former is not different between the white display and the black display, the latter is the reason. That is, since the phase of the reference electric potential of the image signal is inverted by 180° against the driving electric potential Vcom, the reference electric potential fluctuation of the image signal allows the voltage difference in the sensor line to be reduced in the white display and enlarged in the black display. Referring to the waveform LSL of FIG. 23A and the waveform SSL of FIG. 23B, the period of the black display changes in the same phase, but the period of the white display changes in the opposite phase. This fact supports the aforementioned reason.

FIGS. 24B1 to 24B3 illustrate the effect of the embodiment of the present invention. FIGS. 24A1 to 24A3 associated with the white display and FIGS. 24B1 to 24B3 associated with the black display are waveform diagrams by shifting the phase of the one side by 180° against the phase of the other side.

In addition, FIGS. 24A1 and 24B1 are waveform diagrams at the long sensor line LSLi where the noise component N and the signal component S are overlapped. FIGS. 24A2 and 24B2 are waveform diagrams illustrating only the noise component N. FIGS. 24A3 and 24B3 are waveform diagrams after the noise rejection.

For example, the waveform of the LSL output <L> (=S+3N) when the border (driving electrode DE) exists in the position <1> of the table of FIG. 10B corresponds to FIGS. 24A1 and 24B1. In this case, the numeral "3N" in the box of the short sensor associated with the position <1> in FIG. 10B corresponds to FIGS. 24A2 and 24B2. In addition, the waveform of FIG. 24A3 is obtained by subtracting the waveform of FIG. 24A2 from the waveform of FIG. 24A1. Similarly, the waveform of FIG. 24B3 is obtained by subtracting the waveform of FIG. 24B2 from the waveform of FIG. 24B1.

It is recognized from FIGS. 24A3 and 24B3 that the electric potential difference (noise) is suppressed to nearly zero, while it reaches 0.8 m at maximum in FIG. 24A1 of the white display and FIG. 24B1 of the black display.

Based on the descriptions above, it was clarified that the display device according to the embodiment of the present invention is particularly effective to noise suppression when the electric potential fluctuation in the image signal line functions as the noise source.

14. Other Effects

When such a noise source is contemplated, it is preferable that two or three sensor lines are arranged with the same distance from the wiring line functioning as the noise source. For example, it is preferable that the sensor lines are arranged as close as possible from each other. For this reason, it is preferable that the sensor line has a narrow width. In other words, when the control is performed by the width, it is difficult to arrange the sensor lines with the same distance from the noise source although the operation advantageously becomes simple. On the contrary, when the control is performed by the length, it is easy to arrange the sensor lines with the same distance from the noise source although the operation may become more complicated in comparison with the width control case.

Consequently, referring to FIG. 18 or FIG. 19, it is appreciated that a distance between the sensor lines connected to the same operational circuit 8A is set to be as small as possible.

Figure 21:
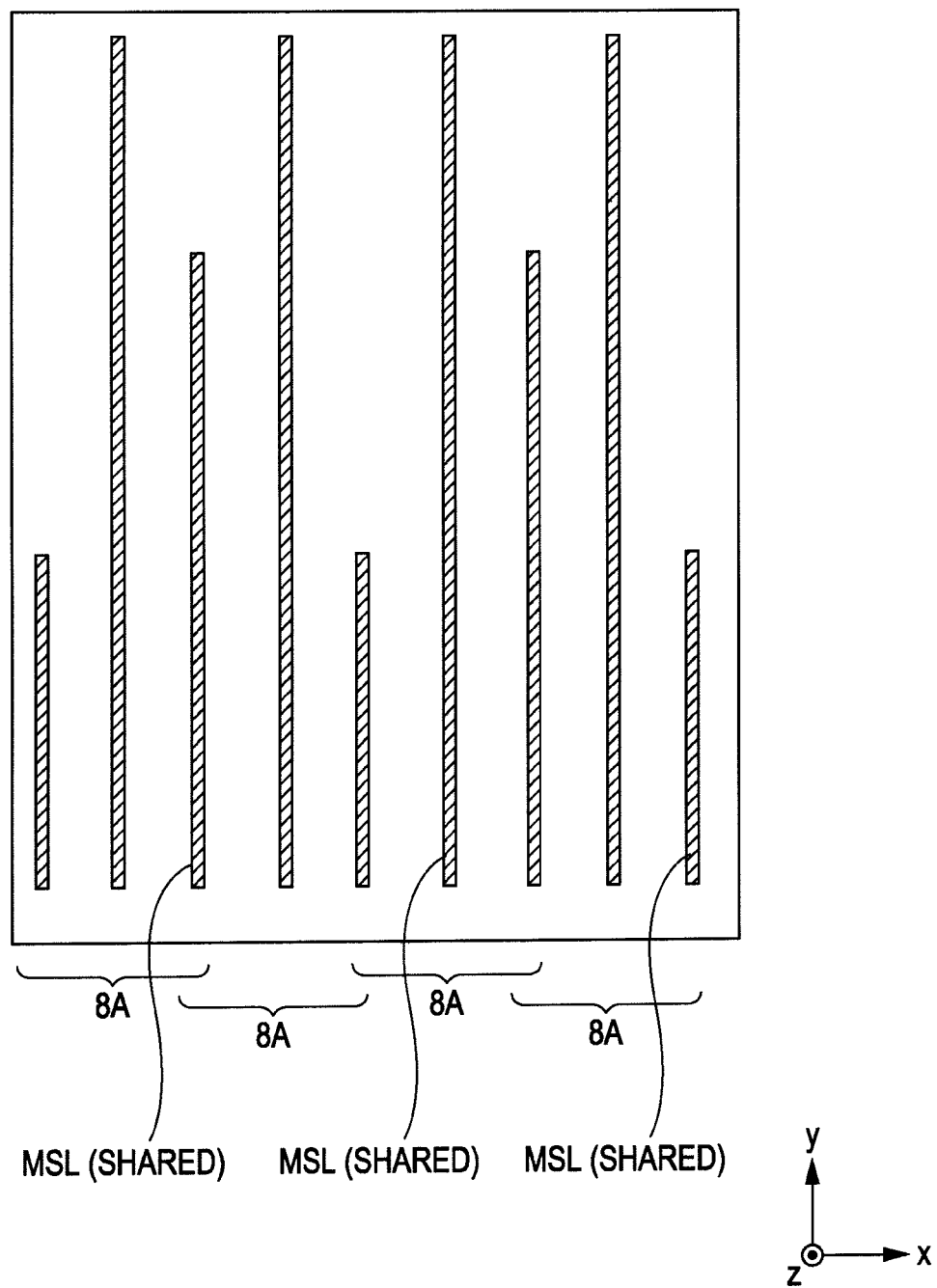
FIG. 21 is a top plan view illustrating another sensor line arrangement according to a tenth modification.

In addition, in the configuration where a sensor line is shared by two neighboring operational circuits 8A as shown in FIGS. 20 and 21, it is possible to increase the sensor line density without degrading the detection sensitivity in the x-direction. In other words, if a margin is provided to the sensor line density in the x-direction under the constriction that the combined sensor lines are arranged with the same distance from the noise source, it is possible to improve the sensitivity by increasing the number of sensor lines. Therefore, it is possible to detect touch with improved accuracy and sensitivity.

Since the shield layer 70 is provided as shown in FIG. 22, it is possible to achieve a more accurate noise rejection process by excluding incoming electromagnetic waves functioning as a noise source usually fluctuating at random. In addition, errors can be effectively prevented by shielding the operational circuit 8A as well using the shield layer 70.

It is preferable that the detection sensitivity in the y-direction can be improved by performing the border scanning as described in the third embodiment, i.e., simultaneously driving a plurality of k driving electrodes 43 (the border) and shifting the border by a minimum pitch corresponding to a single pixel pitch. Through the border scanning, it is possible to obtain an additional effect such as invisualization of the driving electrodes. From the viewpoint of the invisualization, for example, invisualization may be improved by arranging dummy sensor lines in a portion where no sensor line exists among the middle sensor lines MSL or the short sensor lines SSL so that the long sensor line LSL is constantly viewed from the external side.

In addition, since the reset switch RSW is provided for each operational circuit 8A, the operation can be made by excluding the remaining electric charges. Therefore, it is possible to improve accuracy of the operation. In addition, it is possible to obtain more accurate operation results by nearly simultaneously turning on/off the reset switches RSW in a plurality of the operational circuits 8A. The reset switches RSW may be controlled by a CPU (not shown) or the like.

The present application contains subject matter related to that disclosed in Japanese Priority Patent Application JP 2009-155188 filed in the Japan Patent Office on Jun. 30, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A touch detection device comprising:
    a detection surface;
    a plurality of sensor lines formed from a plurality of wiring lines, wherein a plurality of adjacent independent sensor lines are sequentially varying sensor lines, each sensor line of the sequence of adjacent sensor lines having a substantially different length and a corresponding substantially different capacitance than a preceding sensor line in the sequence; and
    a touch detection unit that detects an electric variation generated in a plurality of the sensor lines associated with touch or proximity of a detection target object to the detection surface,
    wherein the touch detection unit has an operational circuit for generating a detection signal corresponding to the detected electric variation at the plurality of the adjacent independent sensor lines.

2. The touch detection device according to claim 1, wherein a plurality of the sensor lines are formed from a plurality of M types of wiring lines that have the different length for each type and are arranged in parallel to one another, and M sensor lines neighboring to one another are a different type.

3. The touch detection device according to claim 2, wherein the M sensor lines are formed from wiring lines having a same material, a same thickness, a same width, and a plurality of different lengths,
    wherein each of the M sensor lines has a length which is a K multiple (where, K=1 to N) of a length L of an elementary sensor line having a shortest length, and
    wherein the operational circuit obtains the detection signal by selecting two sensor lines including a longest sensor line from the M sensor lines, sampling two outputs from the two sensor lines at a timing corresponding to a ratio of the lengths of the two selected sensor lines, and performing a difference operation for sampling values.

4. The touch detection device according to claim 3, wherein the coefficients M and N are set to 3.

5. The touch detection device according to claim 2, wherein the M sensor lines are formed from wiring lines having a same material, a same thickness, a same width, and a plurality of different lengths,
    wherein each of the M sensor lines has a length which is a K multiple (where, K=1 to N) of a length L of an elementary sensor line having a shortest length, and
    wherein the operational circuit obtains the detection signal by selecting two sensor lines from the M sensor lines, obtaining a difference of outputs for the two selected sensor lines of which a ratio of lengths is set to k (where, k is a natural number equal to or larger than 2), and removing the obtained difference with (k−1).

6. The touch detection device according to claim 2, wherein one of the operation circuits and another operation circuit are connected to the same sensor line, and different types of sensor lines are arranged in symmetry with respect to the sensor line common to the two operational circuits.

7. The touch detection device according to claim 2, wherein the different types of M sensor lines are periodically repeatedly arranged.

8. The touch detection device according to claim 1, wherein a plurality of the sensor lines are formed from a plurality of M types of wiring lines that have the different length for each type and are arranged in parallel to one another, and wherein the touch detection device further includes
    a plurality of driving electrodes, each of which is capacitively coupled to a plurality of the sensor lines, arranged in parallel to extend in a direction different from that of a plurality of the sensor lines, and
    a scan driving unit that sequentially voltage-driving (scanning) a plurality of the driving electrodes from a driving electrode of one end to a driving electrode of the other end.

9. The touch detection device according to claim 7, wherein the touch detection unit obtains a position of the detection target object based on the detection signal generated from the operational circuit and time information synchronized with the scanning of the scan driving unit.

10. The touch detection device according to claim 2, wherein each of the operational circuits for each of the M sensor lines that neighbor to one another and have a different type includes a reset switch for simultaneously resetting electric potentials of the sensor lines in all of the operational circuits.

11. The touch detection device according to claim 2, further comprising a conductive layer for shielding a sensor line of a type having a shortest length out of the M sensor lines.

12. A display device having a touch sensor function, the display device comprising:
a display surface;
a plurality of image signal lines;
a display function layer that changes display of the display surface in response to signal voltages applied to a plurality of the image signal lines;
a plurality of sensor lines formed from wiring lines, wherein a plurality of adjacent independent sensor lines are sequentially varying sensor lines, each sensor line of the sequence of adjacent sensor lines having a substantially different length and a corresponding substantially different capacitance than a preceding sensor line in the sequence; and
a touch detection unit that detects an electric variation generated from a plurality of the sensor lines in response to touch or proximity of a detection target object to the display surface,
wherein a plurality of the sensor lines are formed from different types of wiring lines having a different line capacitance due to the different length for each type, and
wherein the touch detection unit includes an operational circuit for generating a detection signal corresponding to the detected electric variation at the plurality of the adjacent independent sensor lines.

13. The display device according to claim 12, wherein a plurality of the sensor lines are formed from a plurality of M types of wiring lines that have the different length for each type and are arranged in parallel to one another, and a plurality of M sensor lines neighboring to one another are a different type, and
wherein the touch detection unit has the operational circuit provided for each of the M sensor lines that neighbor to one another and are a different type.

14. The display device according to claim 13, wherein the M sensor lines are formed from wiring lines having a same material, a same thickness, a same width, and a plurality of different lengths,
wherein each of the M sensor lines has a length which is a K multiple (where, K=1 to N) of a length L of an elementary sensor line having a shortest length, and
wherein the operational circuit obtains the detection signal by selecting two sensor lines including a longest sensor line from the M sensor lines, sampling two outputs from the two sensor lines at a timing corresponding to a ratio of the lengths of the two selected sensor lines, and performing a difference operation for sampling values.

15. The display device according to claim 13, wherein the sensor line having a maximum length out of the M sensor lines intersects with two opposite sides of an effective display area of the display surface, and the sensor line having a minimum length out of the M sensor lines is disposed outside the effective display area.

16. A display device having a touch sensor function, the display device comprising:
a plurality of pixels connected to one another by a plurality of scanning lines and a plurality of image signal lines, each of the pixels having a switch for writing a voltage of corresponding one of the image signal lines in response to a voltage applied to corresponding one of the scanning lines;
a plurality of pixel electrodes provided for each pixel and arranged in a matrix;
m driving electrodes that are arranged opposite the pixel electrodes have a pitch length one or more times a pitch length of the pixel electrodes in a scanning direction which is an arrangement direction of one side of the pixel electrode and are arranged with the same interval in the scanning direction;
a plurality of sensing electrodes having an electrostatic capacitance between each of the m driving electrodes;
a display function layer having an image display function in response to a signal voltage applied between the pixel electrode and the driving electrode that face each other;
a write driving scanning unit that performs a write operation for writing voltages of a predetermined number of the image signal lines by turning on a predetermined number switches for a predetermined number of the pixel electrodes lined up in a direction perpendicular to the scanning direction and repeats a shift operation that sequentially switches a predetermined number of pixel electrodes, in the scanning direction;
an AC driving scanning unit that drives, with an AC voltage, s driving electrodes (where, 1≤s<m) defined from the m driving electrodes under a condition that driving electrodes opposite to a predetermined number of the pixel electrodes as a write target are included, and shills the s driving electrodes as an AC driving target in the scanning direction to satisfy the condition; and
a touch detection unit that detects a variation in a voltage at one or more sensing electrodes,
wherein a plurality of adjacent independent sensing electrodes are sequentially varying independent sensing electrodes, each sensing electrode of the sequence of adjacent sensing electrodes having a substantially different length and a corresponding substantially different capacitance than a preceding sensing electrode in the sequence, and
the touch detection unit includes an operational circuit for generating a detection signal corresponding to a variation in a voltage at a plurality of the sensing electrodes by performing an operation process using an output difference and a line capacitance ratio which are for a plurality of outputs from a plurality of sensing electrodes that have a different length.

17. The display device according to claim 16, wherein the write driving scanning unit selects s consecutive driving electrodes (where, s is equal to or larger than 2) from the m driving electrodes and drives, with an AC voltage, the s selected driving electrodes,
where a signal having a reference electric potential of an image signal repeatedly changing between two levels in response to an AC driving voltage of the driving electrode is applied to a plurality of the image signal lines, and
wherein a plurality of the image signal lines and a plurality of the sensing electrodes are arranged in a parallel stripe shape extending in the same direction.

18. The display device according to claim 16, wherein a plurality of the sensing electrodes are formed from a plurality of M types of wiring lines that have the different length for each type and are arranged in parallel to one another, and a plurality of M sensing electrodes neighboring to one another are a different type, and wherein the touch detection unit has the operational circuit provided for each of the M detection electrodes that neighbor to one another and are a different type.

19. The display device according to claim 18, wherein the M sensing electrodes are formed from wiring lines having a same thickness, a same width, a same material, and a plurality of different lengths, wherein each of the M sensor lines has a length which is a K multiple (where, K=1 to N) of a length L of an elementary sensing electrode having a shortest length, and wherein the operational circuit obtains the detection signal by selecting two detection electrode sensor lines including a longest sensor line from the M sensor lines, sampling two outputs from the two sensing electrodes at a timing corresponding to a ratio of the lengths of the two selected sensing electrodes, and performing a difference operation.

20. The display device according to claim 16, wherein a plurality of the driving electrodes are arranged at a the side of the display surface.

* * * * *